(12) United States Patent
Schäfer et al.

(10) Patent No.: US 6,379,751 B1
(45) Date of Patent: Apr. 30, 2002

(54) IMPARTING WATER-REPELLENCY WITH POLYSILOXANES CONTAINING CARBOXYL GROUPS

(75) Inventors: Walter Schäfer, Leichlingen; Günter Sackmann; Jürgen Reiners, both of Leverkusen; Tillmann Hassel, Pulheim; Manfred Schnee, Leverkusen; Fritz Novotny, Bergisch Gladbach, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/734,400

(22) Filed: Dec. 11, 2000

(30) Foreign Application Priority Data

Dec. 13, 1999 (DE) .......................................... 199 59 949

(51) Int. Cl.[7] .......................... B05D 7/12; C08G 77/388
(52) U.S. Cl. .......................... 427/389; 528/28; 528/38; 528/26; 556/413; 556/418; 556/419; 556/424; 556/425; 556/438; 562/887; 549/263; 525/474
(58) Field of Search ............................. 528/28, 38, 26; 525/474; 556/413, 418, 419, 424, 425, 438; 562/887; 549/263; 427/389

(56) References Cited

U.S. PATENT DOCUMENTS

| | | |
|---|---|---|
| 4,701,269 A | 10/1987 | Bay et al. |
| 4,931,062 A | 6/1990 | Bay et al. |
| 5,284,928 A | 2/1994 | Münzmay et al. |
| 5,316,860 A | 5/1994 | Stewart et al. |
| 5,330,537 A | 7/1994 | Stewart et al. |
| 5,348,807 A | 9/1994 | Hodder et al. |
| 5,554,711 A | 9/1996 | Träubel et al. |
| 5,686,011 A | 11/1997 | Lohmann et al. |
| 5,702,490 A | 12/1997 | Kneip et al. |
| 5,824,814 A * | 10/1998 | Cray et al. |
| 5,885,341 A | 3/1999 | Standke et al. |
| 5,885,474 A | 3/1999 | Reiners et al. |
| 5,955,544 A | 9/1999 | Probst et al. |
| 5,990,334 A | 11/1999 | Hierstetter et al. |
| 6,110,230 A | 8/2000 | Friedrich et al. |

FOREIGN PATENT DOCUMENTS

| | | |
|---|---|---|
| DE | 196 29 986 | 1/1998 |
| EP | 0 095 676 | 12/1983 |
| EP | 0 579 267 | 1/1994 |
| EP | 0 757 108 | 9/1999 |
| EP | 0 891 430 | 11/1999 |

OTHER PUBLICATIONS

Das Leder [Leather], Feb. 1961, pp. 36–40, Internationale Union der Leder Chemiker Verbände Kommission für Physikalische Lederprüfung.

H. Birkhofer et al, Das Leder [Leather]43, Apr. 1992, pp. 71–75, Fachzeitschrift für die Chemie Und Technologie der Lederherstellung Mitteilungsblatt des Vereins für Gerberei–Chemie und Technik E.V.

M. Kaussen, H. Lohmann, H. Kilian, Das Leder [Leather], 43, Sep. 1992, pp. 223–227 Fachzeitschrift für die Chemie und Technologie der Lederherstellung Mitteilungsblatt des Vereins Fü Gerberei–Chemie und—Technik E.V.—Hydrophobieren ohne Fixieren—Ein Zwischenbericht über neue Entwicklung Neither English Language Equivalent nor an English Language Translation is available.

* cited by examiner

*Primary Examiner*—Robert Dawson
*Assistant Examiner*—Kuo-Liang Peng
(74) *Attorney, Agent, or Firm*—Joseph C. Gil; Richard E. L. Henderson

(57) ABSTRACT

The invention relates to polysiloxanes containing carboxyl groups that are useful for imparting water-repellency to substrates, a process for their preparation, a water-repellent system containing such polysiloxanes, and a process for the production of hydrophobic substrates.

22 Claims, No Drawings

IMPARTING WATER-REPELLENCY WITH POLYSILOXANES CONTAINING CARBOXYL GROUPS

The invention relates to polysiloxanes containing carboxyl groups and intended for imparting water-repellency to substrates, in particular paper, textiles, leather or hides, in particular to leather and hides, and a process for their preparation, a water-repellent system containing this polysiloxane and a process for the production of hydrophobic substrates.

Upper leather, bag leather, apparel leather or automobile and furniture leather can be treated with softening retanning agents and water repellents so that a supple; water-repellent leather (waterproof leather) results, which does not permit penetration of water even under dynamic load. To achieve comfortable wear properties, leathers having high water vapour permeability are required. This is necessary, for example, for shoes or apparel leather.

Silicones containing carboxyl groups are disclosed in DE-A-35 29 869, DE-A-38 00 629 and WO 95/22627. These are silicones which contain carboxyl groups and whose COOH groups are linked to the silicone main chain via an alkylene group. The availability of these compounds on the industrial scale is however limited: the synthesis could be carried out, for example, by a platinum-catalyzed addition reaction of acids having unsaturated terminal groups with silicone oils having SiH functional groups, it being necessary to avoid secondary reactions by using protective groups. Finally, the protective group must also be removed hydrolytically by means of bases or acids. Such processes are also expensive. Furthermore, the stability of such emulsions during storage is still insufficient and the water-repellent effect is unsatisfactory.

DE-A-44 04 890 describes a process for imparting water-repellency to leather with polysiloxanes containing carboxyl groups in an aqueous emulsion in the presence of emulsifiers, which is characterized in that polysiloxanes, carboxyl-functionalized in a comb-like manner are used, in which the carboxyl groups are linked to the polymer main chain via spacer groups in the form of linear or branched $C_2$- to $C_{40}$-alkylene groups which can be interrupted by specific substituents. In the Examples, water-repellency is imparted to leather with polysiloxanes whose carboxyl groups are linked to the polysiloxane main chain via a $(CH_2)_{10}$ spacer. Maeser values of 15000–30000 or 20000 to >100000 flexes were obtained by mineral salt fixation.

DE-C-196 46 916 relates to the use of carboxamido-polysiloxanes which are obtainable by reacting polysiloxanes having amino functional groups with dicarboxylic anhydrides for imparting water-repellency to materials of fibrous structure, in particular to leather and hides. The carboxyamido-polysiloxanes have a carboxyl group content of from 0.02 to 1.0 mmol/g and a molar mass Mn in the range from 2000 to 60000 g/mol. When these compounds are used, the leather treatment can be carried out in an aqueous liquor. Moreover, aftertreatment with metal salts and the use of emulsifiers and solvents is said to be unnecessary. The compounds mentioned in DE-C-196 46 916 can be prepared according to EP-A-95 676. However, as is evident from the Application Examples of DE 196 46 916, they do not reach the water-repellency values required for waterproof leather. As a rule, more than 50000 flexes are required in the Maeser test (based on ASTM D 2099–70). This is the number of flexes which the leather must withstand in a water bath under mechanical compression without water penetration. The leathers stated in DE-C- 196 46 916 become water-permeable only after a number of compressions 50% higher than the control (14600 compressions) (page 14, lines 45 to 47). Consequently, in spite of this progress, the achievable water-repellency effect is still insufficient. In the description, reference is made to the customary fixation with formic acid. The effect of imparting water-repellency can be enhanced by an aftertreatment with a divalent, trivalent or tetravalent metal salt customary in tanning, in particular with a basic chromium sulphate, with aluminium sulphate, zirconium sulphate, titanium sulphate, calcium chloride or magnesium sulphate (page 9, lines 25 to 27). In the Examples, use is also made of fixation with a chromium salt. Nevertheless, the Maeser values are still too low for many requirements. Conversely, however, this means that the fixation in the absence of metal salts is still in need of improvement.

However, with the use of carboxamido-polysiloxanes, polysiloxanes containing carboxyl groups and in particular polysiloxanes which contain free amino groups, further disadvantages still occur. The leathers dyed with customary dyes have a nonuniform colour intensity which may manifest itself in particular in the leather having two different sides. This means a colour difference between the grain side and flesh side of the leather, the flesh side appearing to have a substantially more intense colour than the grain side. The handle of the leather, too, is often silky, undesirably silicone-like or greasy when the known silicones are used.

DE-A-196 29 986 relates to a process for imparting water-repellency to leathers which have been tanned, in the absence of vegetable, synthetic and mineral tanning agents, only with polymer tanning agents and optionally, for pretanning, with aldehydes or reactive carbonyl compounds, in which polysiloxanes according to WO 95/22627 (polysiloxanes carboxyl-functionalized in a comb-like manner) are used as water repellents. For these products, too, fixation with zirconium salts is described, in order to achieve sufficient water-repellency effects.

DE-A-196 39 782 describes water-based organopolysiloxane-containing compositions which, when diluted with water, liberate essentially no alcohols and contain glycidyl ether alkyl and/or (meth)acryloyloxyalkyl groups as functional groups, each silicon in the organopolysiloxane carrying a functional group. In addition, aminoalkyl radicals are also claimed as a further functional group. The products are prepared by cohydrolysis of water-soluble organosilanes and are recommended, inter alia, for imparting water repellency to textile, leather and cellulose and starch products. Carboxyl groups are not mentioned as substituents.

DE-A-196 51 287 Al relates to ionic organosilicon compounds and their preparation and use. The claimed compounds are preferably obtained by an addition reaction of the double bond of functional acrylates or acrylamides with aminopolysiloxanes. The claimed ionic organosilicon compounds complex with transition metals and can thus bind permanently in the leather treatment (chrome-tanned leathers) and lead to a permanent hydrophilic treatment with the desired soft handle. In textile treatment, too, they have the advantage of leading to a soft handle with good body in addition to very good hydrophilic properties and very good antistatic properties (page 20, lines 21 to 27). These are in principle polysiloxanes having betaine character. Such products are however less suitable for imparting to leather water-repellency which must also withstand water penetration under dynamic loads, since the incorporated betaine groups do not lose their hydrophilic character (which however is desirable according to the statements in DE 196 51 287) and thus adversely affect the water-repellency effect.

DE-A-197 07 970 relates to polyorganosiloxanes having polycarboxylic acid functional groups. They are preferably prepared by reacting polysiloxanes having amino functional groups with polycarboxylic anhydrides, tricarboxylic anhydrides and tetracarboxylic anhydrides being used. Thus, at least two carboxyl groups are bonded to each amino group of the silicon via an amido group. This particular arrangement of at least two carboxyl groups per radical having a polycarboxylic acid function leads to high affinity of the polyorganosiloxanes having polycarboxylic acid functional groups to cationic substrates, in particular metal ions, owing to the chelate effect. Consequently, they are particularly suitable for the treatment of tanned leather (page 3, lines 2 to 5). However, the Examples propose a procedure in organic solvents which is no longer relevant in practice in the leather industry: thus, the silicones are present as solutions in petroleum ether or methyl isobutyl ketone (MiBK). The stated water-repellency values (static water absorption and Bally penetrometer) are as a rule insufficient.

DE-A-43 30 378 discloses anionic urethanes containing cyanamide groups and having relatively long hydrocarbon radicals, which are suitable as retanning agents for leather and textiles and as emulsifiers. As emulsifiers, the claimed compounds have the advantage that, after use, they dimerize or oligomerize and thereby lose their ionic character and hence their hydrophilic properties. However, the products are likewise inadequate in their water-repellency effect if they are used alone.

The publication by H. Birkhofer, Das Leder [Leather] 43, pages 71–75 (1992) discloses reactive water repellents based on polymers having reactive groups.

Polysiloxanes containing alkylsulphosuccinates and sulphosuccinic acid groups require no fixation with mineral salts: M. Kaussen, H. Lohmann, H. Kilian, Das Leder [Leather] 43 (9), pages 223–227 (1992) and DE 42 14 150. However, the water-repellency effect of such products is likewise still in need of improvement since sulpho groups in general impart excessively high hydrophilicity to the treated leather.

In EP-A-579 267 and EP-A-372 746, amphiphilic copolymer dispersions which are prepared by copolymerization of hydrophilic monomers, preferably acrylic acid, and hydrophobic monomers, preferably long-chain alkyl methacrylate, are used. Leathers which are washable or are suitable for dry cleaning are obtained. The products achieve their maximum effect only through retanning with mineral tanning agents, in particular with chromium salts.

EP-A-891 430 describes the use of copolymers of dicarboxylic acid (anhydrides), (maleic anhydride) and lower olefins (isobutene) and hydrophobic comonomers ($C_{20}$–$C_{24}$-olefins) in retanning/fatliquoring of leather/imparting water repellency to leather, also in combination with paraffin water repellents or silicone water repellents. These combinations, too, display their full water repellency effect only after fixation with mineral salts, in particular with chromium salts.

EP-A-757 108 discloses a process for the preparation of water-repellent leathers with silicone oils which are dispersed in a copolymer comprising an unsaturated water-soluble acidic or basic monomer and a hydrophobic comonomer. Very good water-repellency effects can be achieved with the products used, only in combination with chromium salt fixation.

Thus, numerous water repellents have already been proposed. The known products meet the various, high requirements for the water repellency of the finished leather, the requirements with respect to the handle properties, the tensile strength, the uniformity of colour, the finishability and the water vapour permeability—generally a combination of several of these properties are required—only to an insufficient extent. In addition, they must be fixed with mineral salts in order to achieve the optimum with regard to water repellency. Water repellents fixed with formic acid give leathers which already have a certain hydrophobic character but which are not optimally suitable for use as upper leather: hydrophobic leathers should have a reduced static water absorption and a water-repellent effect and additionally be waterproof under high dynamic load, have a soft handle and moreover be permeable to water vapour in order to ensure a high degree of comfort when worn. However, they may not change the mechanical strength of the leather article even in the case of soft leathers, which is particularly important for upper leather. In addition, the leather surface may not stick or have the typical silicone handle. Moreover, the body of the leather should be advantageously affected. Further requirements consist in the light-fastness and heat stability of the leather. Permanence of the water repellency is also desired. Wet fastness and colour fastness are particularly important for apparel leather. From the point of view of the application, it is also necessary to fulfil requirements which permit convenient use by the customer: the products should have low viscosity and should be dilutable with water. In addition, they should have the required shelf-life. Silicone products in particular are generally critical in this respect since they are either too coarse-particled and then tend to phase separation or contain additional emulsifiers which adversely affect the water repellency and have a wetting effect. The leathers treated with water repellents furthermore may not exhibit undesired loose grain. The finishability of hydrophobic leathers, too, is a major problem since the adhesion of aqueous coatings to the hydrophobic substrate is unsatisfactory or, in the case of too superficial a seat of the silicone, an aqueous coating material for leather finishing would be repelled directly during the attempt at application.

Furthermore, there is an application problem in converting the hydrophobic active ingredient into a stable and finely divided emulsion in order to achieve rapid and uniform distribution of the active ingredient in the drum liquor during use in the tannery. The emulsifiers used to date remain in the leather and counteract the water-repellency effect and should therefore be avoided in water repellents. It is also necessary to achieve complete exhaustion of the liquor. This is because product which is not applied incurs high costs for the leather manufacturer and pollutes the environment.

The water repellents used according to the prior art thus furthermore require some improvements. Products which preferably exhibit the same efficiency exclusively with formic acid fixation as with the fixation customary to date using chromium salts or other mineral salts and which meet the above-mentioned requirements are desired. It is advantageous for the user to reduce the time spent by shortening the individual steps in leather manufacture or by combining specific treatment steps. In this context, liquor change and washing processes must be minimized in practice. The tanner furthermore expects products which are readily compatible with the customary auxiliaries which are used in retanning, dyeing and fatliquoring.

The object of the present invention is the provision of an aqueous water-repellent system for leather or hides which, with a simple acid fixation, achieves waterproof properties which are just as good as with classical mineral salt fixation and moreover meets requirements with respect to softness, uniformity of colour, finishability, and water vapour permeability of the leathers produced therewith.

It is also the object of the invention to provide a water-repellent system which contains additional emulsifiers, which do not impair the hydrophobic properties and, on drying, lose their effectiveness as an emulsifier (self-inhibiting emulsifiers), and which is permanently fixed in the leather.

It has surprisingly been found that the disadvantages, described above, of the water repellents according to the prior art are avoided if a water-repellent system containing a) a polysiloxane containing carboxyl groups, which is characterized in that the polysiloxane chain contains at least one structural unit of the formula (1)

$$[AR_aSiO_{(3-a)/2}]_k \quad (1)$$

and/or at least one structural unit of the formula (2)

$$[R_cSiO_{(4-c)/2}]_n \quad (2)$$

and optionally at least one terminal group selected from the formulae $$R_3SiO_{1/2} \quad (3)$$

and $$AR_2SiO_{1/2} \quad (3a),$$

A representing a radical containing carboxyl groups and of the formula

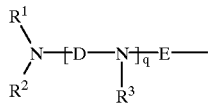

in which
R$^1$, R$^2$ and R$^3$, independently of one another, represent hydrogen or a monovalent C$_2$–C$_{60}$-hydrocarbon radical which optionally contains one or more non-neighbouring ether, imino, amido, urea, urethane, ester or carboxyl groups and which is optionally substituted by one or 2 carboxyl groups —COOM and/or 1 or 2 hydroxyl groups, and
the radical A being substituted at least by one group COOM,
M representing hydrogen or Na$^+$, K$^+$, Li$^+$, NH$_4^+$,

R$^4$, R$^5$ and R$^6$, independently of one another, representing C$_1$–C$_{18}$-alkyl, in particular C$_1$–C$_4$-alkyl or substituted C$_1$–C$_{18}$-alkyl, in particular hydroxyalkyl or aralkyl, in particular benzyl,
and R$^1$ to R$^3$, independently of one another, being linked to the nitrogen atom via a single bond or a group —COO—, —CO— or —CONH—, and
R$^1$ and R$^2$ not simultaneously representing H and also not simultaneously being linked to the nitrogen atom via a carbonyl group,
D and E, independently of one another, represent a divalent C$_2$–C$_{20}$-hydrocarbon radical which may be substituted by hydroxyl or interrupted by non-neighbouring O atoms,
q represents 0 to 3,
R represents a C$_1$- to C$_{12}$-alkyl radical or a phenyl radical,
a represents 0 or 1,
k represents 0 to 50,
c represents 1 or 2 and
n represents 10 to 1000,
with the proviso that at least one terminal group of the formula (3a) is present where the polysiloxane chain contains only structural units of the formula (2), and b) at least one component from the group B$_1$ to B$_4$,
B$_1$ being an anionic copolymer,
B$_2$ being polyaspartic acid or a derivative thereof,
B$_3$ being a paraffin and
B$_4$ being an isocyanate adduct,
is used.

Preferred polysiloxanes a) containing carboxyl groups have, for example, the following structures:

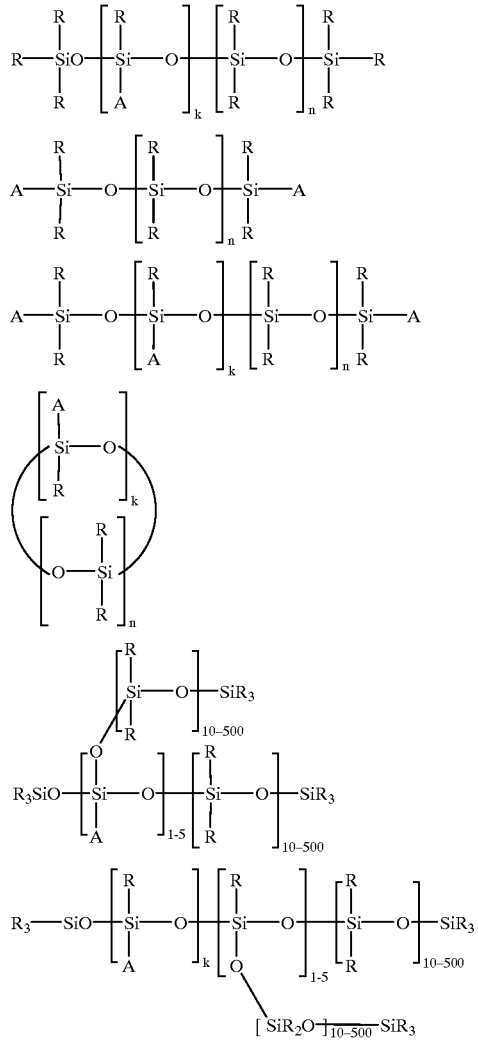

Linear polysiloxanes a) are particularly preferred.

In the context of this application, "system" in the term "water-repellent system" is understood as meaning that the components a) and b) of the system are used as individual components, for example in the form of their aqueous solutions or dispersions, or are present in any desired combination with one another. It is preferable to use the components of the system as individual components simultaneously or in succession. Preferably, the polysiloxane a) is used as the last component after one or more components $B_1$ to $B_4$. Furthermore, it is preferable to use polysiloxane a) and component $B_4$ after one or more components $B_1$ to $B_3$.

Preferred polysiloxanes a) containing carboxyl groups are those in which, in the meaning of the substituent A in the above-mentioned formula (1), the radicals $R^1$ to $R^3$, independently of one another, represent a radical of the formula (1a)

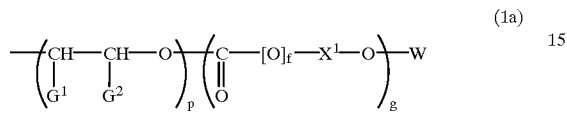

in which
  $G^1$ and $G^2$, independently of one another, represent H or $CH_3$,
  $X^1$ represents a divalent hydrocarbon radical having 2 to 30 carbon atoms,
  W represents H or the group

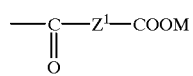

$Z^1$ representing a divalent hydrocarbon radical having 1 to 20 carbon atoms and
  M having the above-mentioned meaning,
  p represents 0 to 5,
  f represents 0 or 1,
  g represents 0 to 3,
or of the formula (1b)

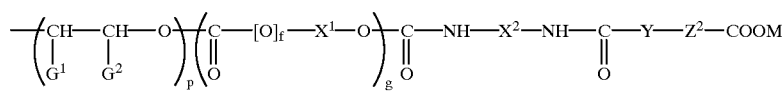

in which
  $G^1$, $G^2$, $X^1$, W, p, f, g and M have the above-mentioned meaning and
  $X^2$ represents a divalent hydrocarbon radical having 2 to 20 carbon atoms,
  $Z^2$ represents a divalent hydrocarbon radical having 1 to 20 carbon atoms which may optionally be substituted by a further group —COOM, —$NH_2$ or —OH, M having the above-mentioned meaning, and
  Y represents —O—, —NH— or —N($C_{1-4}$-alkyl)- ,
or of the formula (1c)

$$-Z^3-COOM \qquad (1c)$$

in which
  $Z^3$ represents an alkylene radical having 1 to 10 carbon atoms which may optionally be substituted by a further group —COOM, and
  M has the above-mentioned meaning.

Radicals $R^1$ to $R^3$ of the formulae

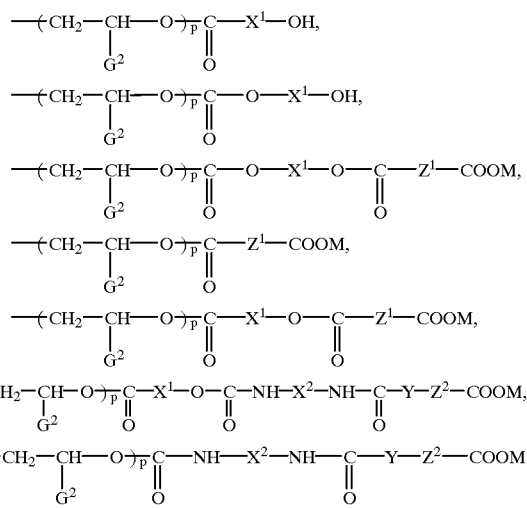

or —$Z^3$—COOM, $G^2$ representing H or $CH_3$ and
  $X^1$, $X^2$, $Z^1$, $Z^2$, $Z^3$, Y, M and p having the above-mentioned meaning,
are particularly preferred.

Suitable radicals $X^1$ are, for example,

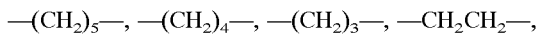

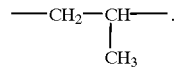

Suitable radicals $X^2$ are, for example,

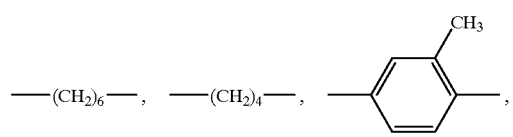

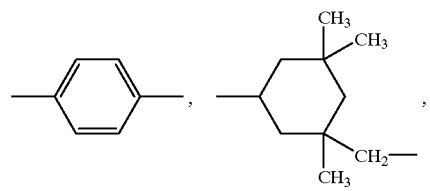

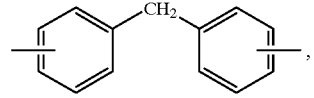

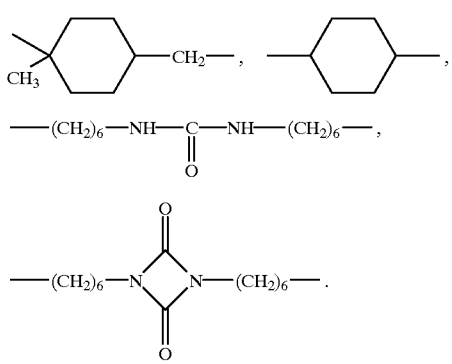
Suitable radicals $Z^1$ are, for example,
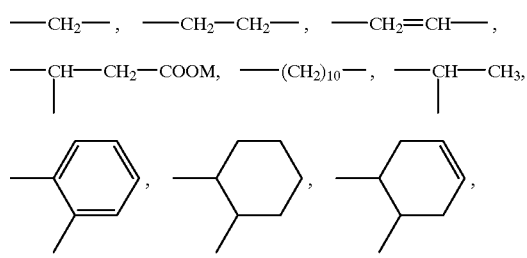
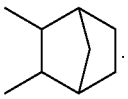
Suitable radicals $Z^2$ are, for example,
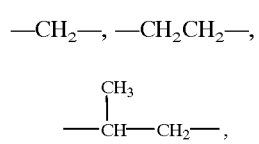
Suitable radicals $Z^3$ are, for example,
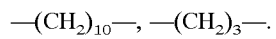
Preferred substituents A are
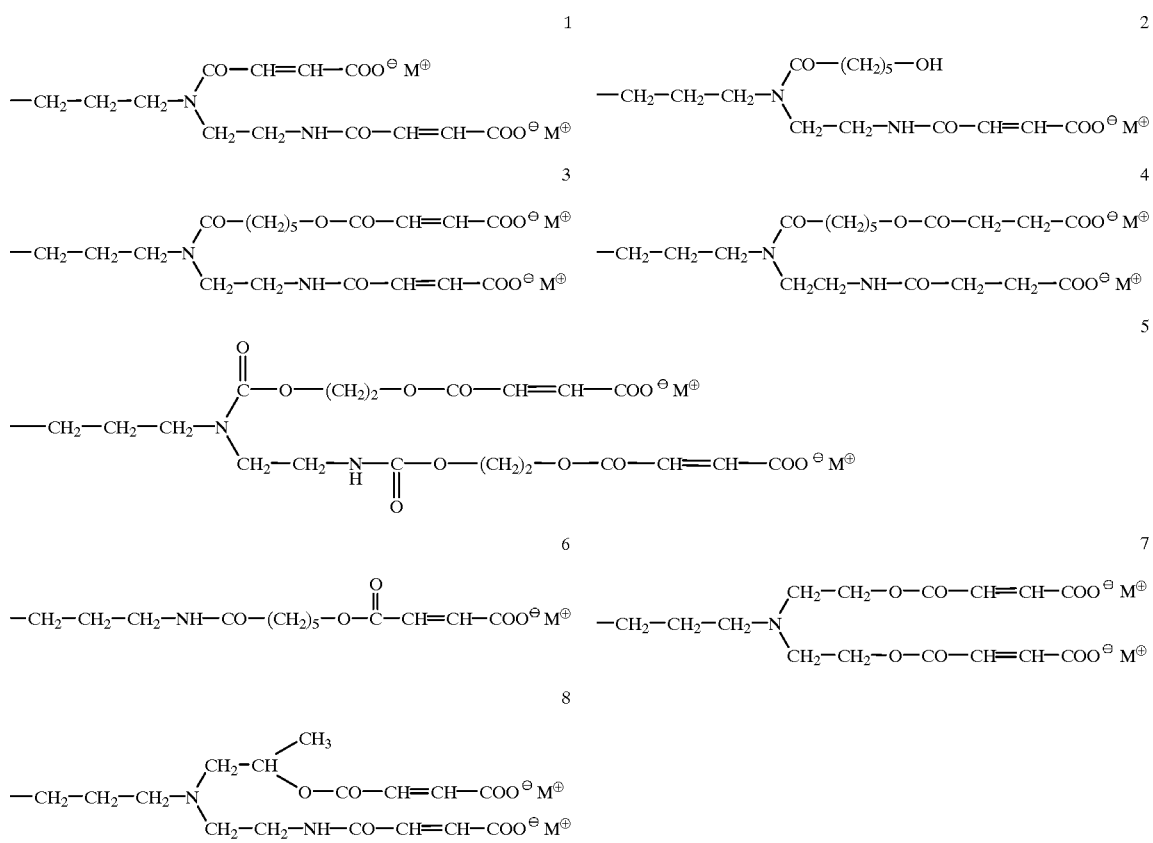

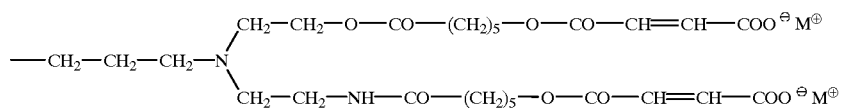
9
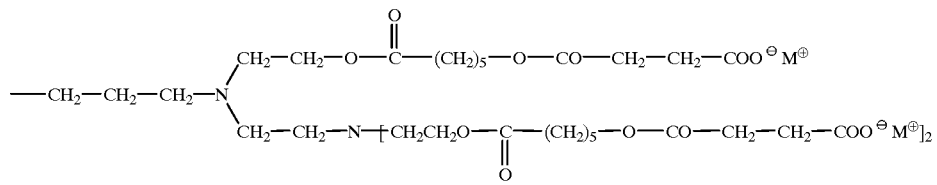
10
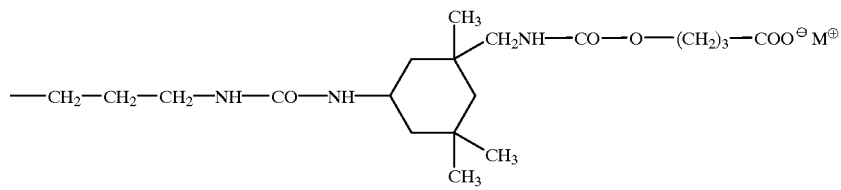
11
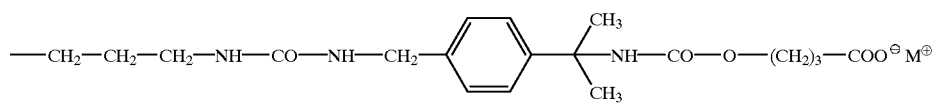
12
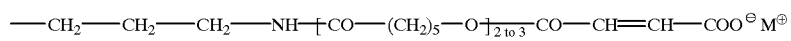
13
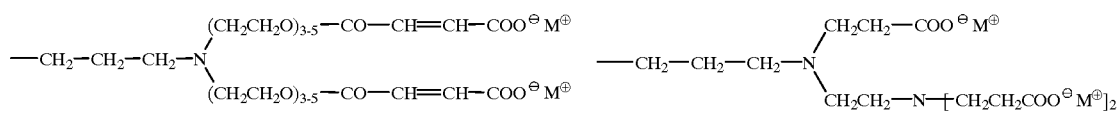
14      15
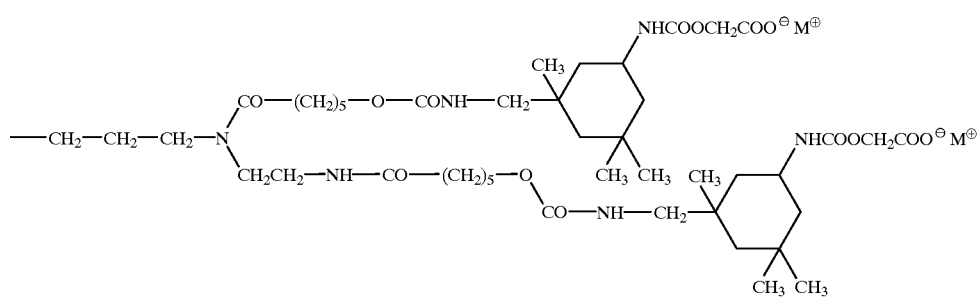
16
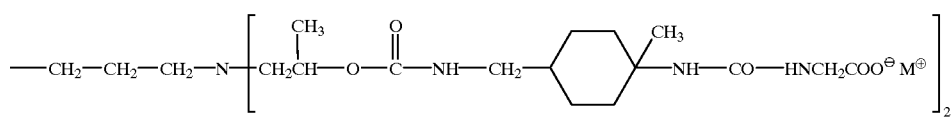
17
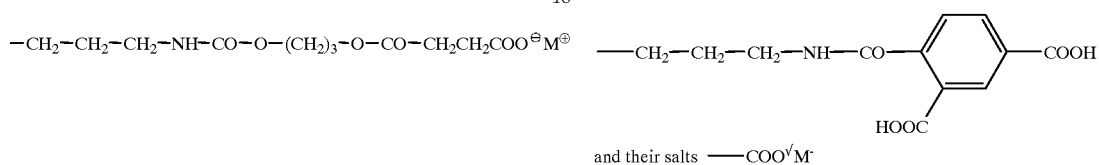
18      19
and their salts —COO$^{\vee}$M$^-$

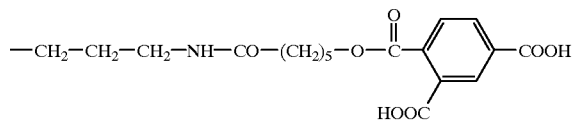

20 and their salts ——COO⁻ᵛM⁻

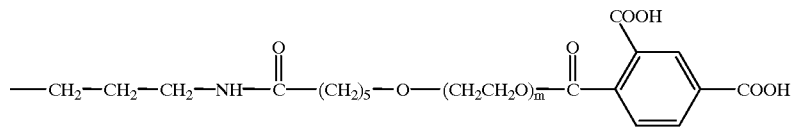

21

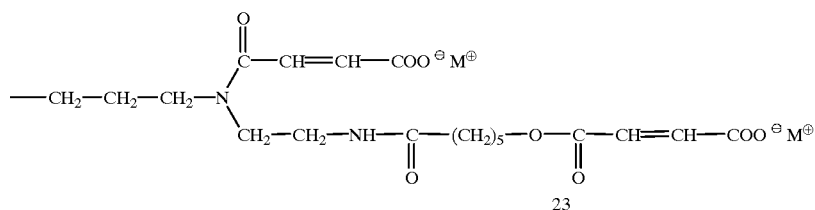

22

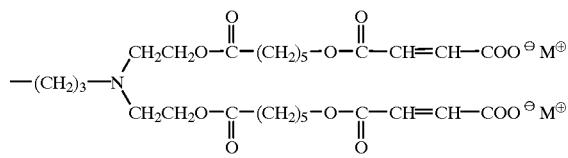

23

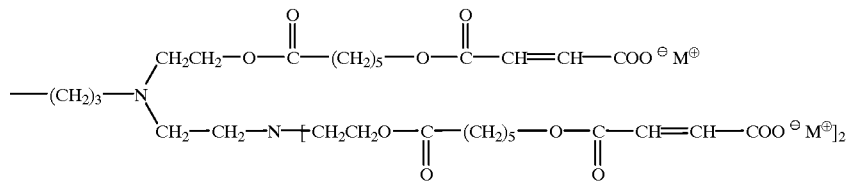

24

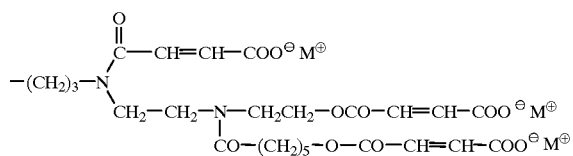

25

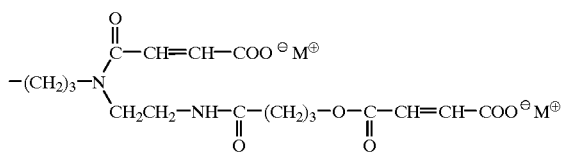

26

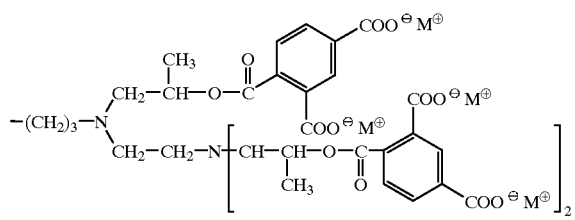

27

Polysiloxanes a) according to the invention and to be used are composed of functionalized siloxane units, such as those of the formulae (1) and optionally of the formula (3a), and unfunctionalized siloxane units, such as those of the formula (2) and optionally of the formula (3). Preferably, the polysiloxanes a) contain on statistical average 50 to 1000, particularly preferably 50 to 400, unfunctionalized siloxane units (2) and 1 to 50, particularly preferably 1 to 20, functionalized siloxane units (1), it being possible for the siloxane units to be arranged in any desired sequence within the polymer chain. Preferably, the linear polysiloxanes a) contain 2 terminal groups of the formulae (3) and/or (3a), particularly preferably terminal groups of the formula (3). It is also possible for the polysiloxanes a) to have a cyclic structure known per se, in which case they contain only structural units of the formulae (1) and (2). This is the case if a in formula (1) represents a=1 and c in formula (2) represents c=2. It is furthermore possible for the polysiloxanes a) containing carboxyl groups to have a branched structure. This is the case if a in formula (1) represents a=0 and/or c in formula (2) represents c=1. Depending on the degree of branching, branched polysiloxanes contain a terminal group of the formula (3) or (3a) at the end of each branching siloxane chain. Each chain emanating from the branching point may contain a different number of siloxane units of the formula (1) and/or (2), the sum of these units corresponding to the definition of k and n. A polysiloxane a) may contain different substituents A. It is also possible for polysiloxanes having different radicals A to be mixed in the polysiloxane chains. The polysiloxanes to be used according to the invention preferably contain functionalized siloxane units in the following ratio, based in each case on the totality of all functionalized sitoxane units in the formulae (1) and (3a):

80–100 mol %, preferably 90–100 mol %, of siloxane units functionalized by carboxyl groups (—COOM) and 0–20 mol %, preferably 0–10 mol %, of siloxane units functionalized by hydroxyl groups and/or amino groups (—NH—, —NH$_2$)

0–10 mol %, preferably 0–5 mol %, of siloxane units functionalized by hydroxyl and carboxyl groups (—COOM).

The amino groups are preferably those which result from a reaction which may be incomplete (see process).

Preferred polysiloxanes a) are those which have an average molar mass of 1000 to 100000 g/mol, particularly preferably 2000 to 50000 g/mol, and/or have a content of carboxyl groups or of salts thereof of 0.05 to 1.5 mmol of COOM per gram of polysiloxane active ingredient and/or have a content of hydroxyl groups of 0 to 0.15 mmol of OH per gram of polysiloxane active ingredient.

The invention furthermore relates to novel polysiloxanes which contain carboxyl groups and are characterized in that they contain at least one structural unit of the formula (1d)

$$[A^1R_aSiO_{(3-a)/2}]_k \quad (1d)$$

and/or at least one structural unit of the above-mentioned formula (2) and optionally at least one terminal group selected from the formulae $$R_3SiO_{1/2} \quad (3)$$

and $$A^1R_2SiO_{1/2} \quad (3d),$$

$A^1$ representing a radical from the group

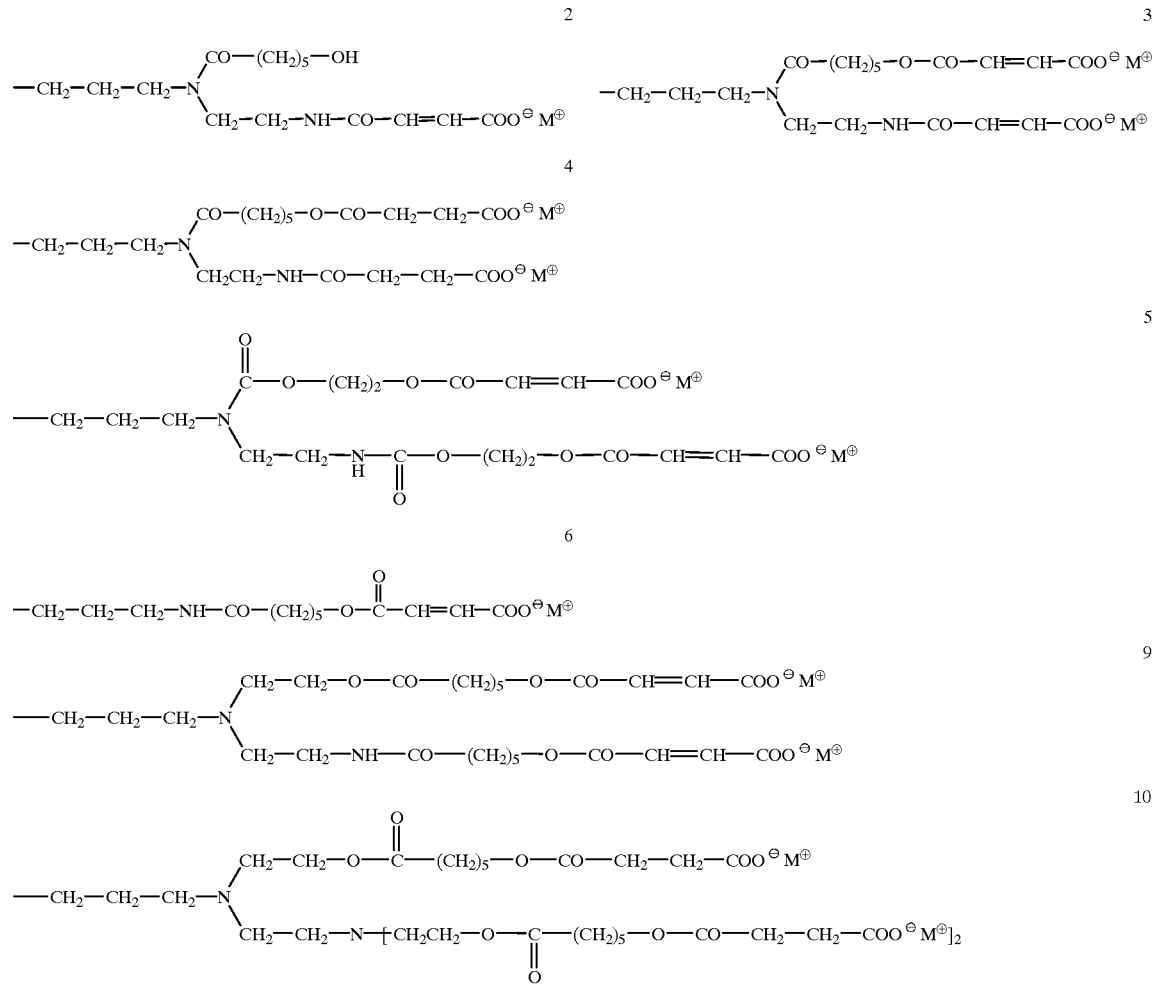

-continued
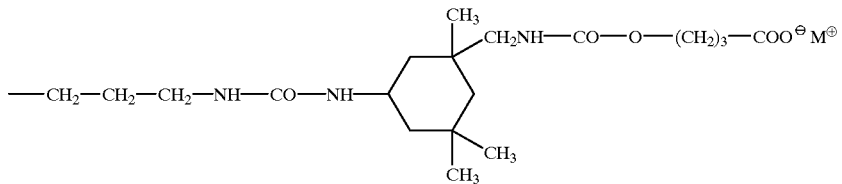
11
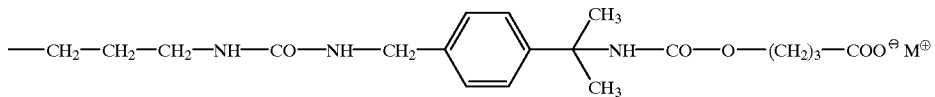
12
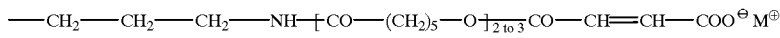
13
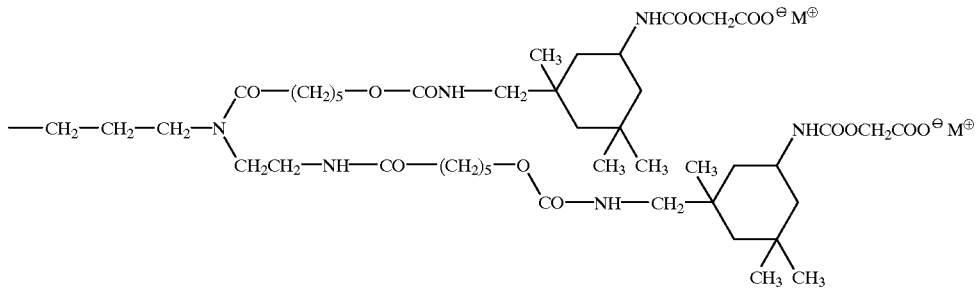
16
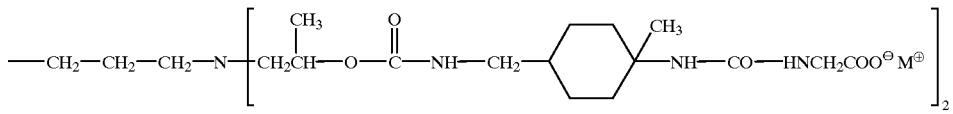
17
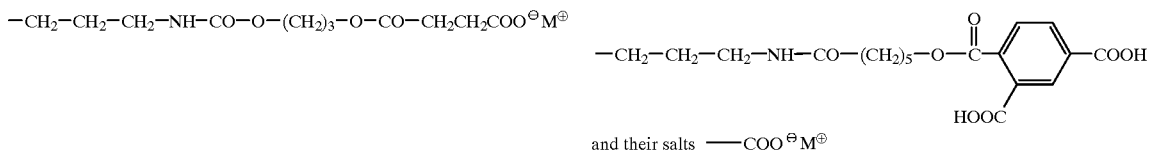
18 20
and their salts —COO⁻M⁺
21
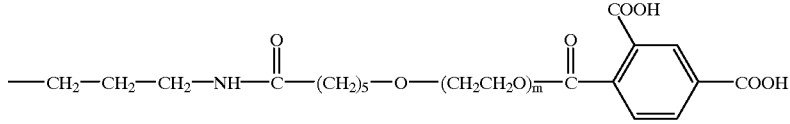
and their salts —COO⁻M⁺
22
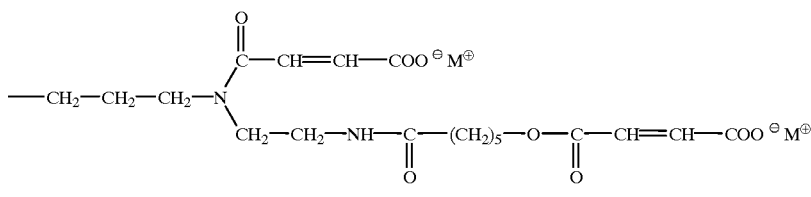
23
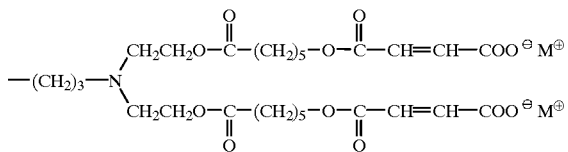

-continued

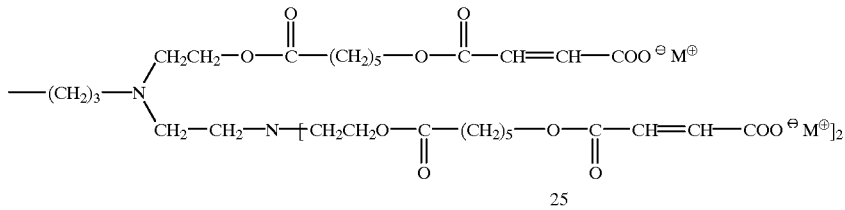

24

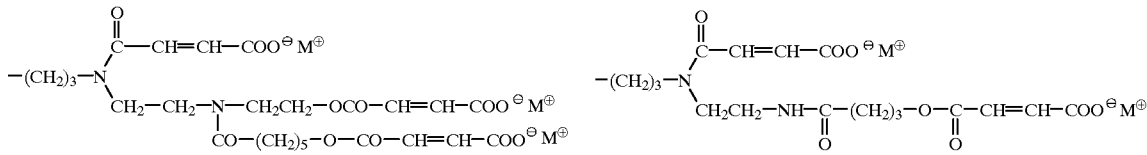

25

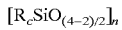
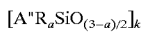

26

M, R, a and k having the above-mentioned meaning, with the proviso that at least one terminal group of the formula (3d) is present where the polysiloxane chain contains only structural units of the formula (2).

The polysiloxanes according to the invention are composed of functionalized siloxane units of the formula (1d) and optionally (3d) and unfunctionalized siloxane units of the formula (2) and optionally of the formula (3). Preferably, the polysiloxanes contain on statistical average 50 to 1000, particularly preferably 50 to 400, unfunctionalized siloxane units and 1 to 50, particularly preferably 1 to 20, functionalized siloxane units. The polysiloxanes according to the invention preferably contain functionalized siloxane units in the following ratio, based in each case on the totality of all functionalized siloxane units in the formulae (1d) and (3d):

- 80–100 mol %, preferably 80–98 mol %, of siloxane units functionalized by carboxyl groups (—COOM) and
- 0–20 mol %, preferably 2–20 mol %, of siloxane units functionalized by hydroxyl groups and/or
- 0–10 mol %, preferably 0–5 mol %, of siloxane units functionalized by hydroxyl groups and carboxyl groups (—COOM).

Suitable polysiloxanes according to the invention are also those which have a hydroxyl group and at least one carboxyl group —COOM on the radicals $A^1$, or those whose radicals $A^1$ have a different content of carboxyl groups and/or hydroxyl groups.

The invention furthermore relates to a process for the preparation of the polysiloxanes according to the invention, which is characterized in that an aminopolysiloxane which contains structural units of the formula (2)

$$[R_cSiO_{(4-c)/2}]_n \quad (2)$$

and structural units of the formula (4)

$$[A'R_aSiO_{(3-a)/2}]_k \quad (4)$$

and/or optionally terminal groups of the formula

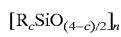 (4a)

and/or optionally terminal groups of the formula (3)

 (3)

in which

R, a, c, k and n have the above-mentioned meaning and

A' represents a radical of the formula

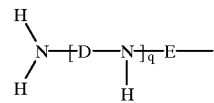

in which D, E and q have the above-mentioned meaning, is reacted optionally after prior reaction with $C_1$–$C_{10}$-alkylene oxides to give the corresponding hydroxyalkyl-aminopolysiloxanes—with a lactone (6a)

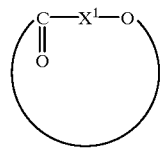 (6a)

or a cyclic carbonate (6b)

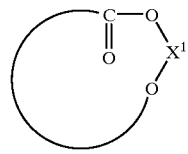 (6b)

in which $X^1$ represents a divalent hydrocarbon radical having 2 to 30 carbon atoms, and the resulting hydroxyl-functionalized polysiloxane which contains structural units of the formula (2)

$$[R_cSiO_{(4-2)/2}]_n \quad (2)$$

and of the formula (5)

$$[A''R_aSiO_{(3-a)/2}]_k \quad (5)$$

and/or optionally terminal groups of the formula $$A''R_2SiO_{1/2} \quad (5a)$$

and/or optionally of the formula (3)

$$R_3SiO_{1/2} \qquad (3),$$

R, a, c, k and n having the above-mentioned meaning and A" representing the radical

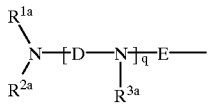

q, D and E having the above-mentioned meaning and $R^{1a}$, $R^{2a}$ and $R^{3a}$ representing H or the group

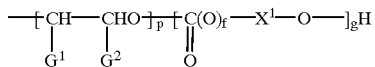

$G^1$, $G^2$, p, f, g and $X^1$ having the above-mentioned meaning,
is reacted with a polycarboxylic acid derivative of the formula

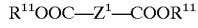

or with a polycarboxylic anhydride of the formula (6c)

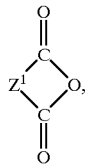

(6c)

$Z^1$ having the above-mentioned meaning and
$R^{11}$ representing $C_1$- to $C_4$-alkyl, and the resulting polysiloxane, which contains structural units containing carboxyl groups (having functional groups COOH), is converted with bases into the salt form (COO⊖M⊕), M having the above-mentioned meaning.

The reaction of amines with lactones or carbonates is known per se, as is the reaction of hydroxy compounds with anhydrides to give carboxyl-containing compounds (monoester formulation).

The aminopolysiloxanes used are commercially available or are obtainable, for example, by base-catalyzed reaction of polydimethylsiloxanes with aminoalkyl-dialkoxy-alkyl-silanes (equilibrium reactions) with removal of the resulting alcohol by distillation.

The invention furthermore relates to a process for the preparation of the polysiloxanes according to the invention which are substituted by radicals $A^1$ which are interrupted by urethane or urea groups, which is characterized in that an aminopolysiloxane which contains structural units of the above-mentioned formulae (2), (4) and/or optionally (4a) and/or optionally (3) or a polysiloxane prepared therefrom, having hydroxyl functional groups and containing structural units of the above-mentioned formula (5) and optionally of the above-mentioned formula (5a) and/or (3) is reacted with a polyisocyanate of the formula (7)

$$X^2(NCO)_t \qquad (7),$$

 representing a t-valent radical having 2 to 30 carbon atoms and t representing 2 or 3, preferably 2,
and the NCO-functionalized polysiloxane obtained is reacted with a hydroxycarboxylic or aminocarboxylic acid of the formula (8) or (8a), respectively,

$Z^2$ representing a divalent $C_1$- to $C_{20}$-hydrocarbon radical which may be substituted by carboxyl, amino or hydroxyl groups,
the remaining NCO groups being completely reacted,
and the polysiloxane containing carboxyl groups is then neutralized with a base, the carboxyl groups being converted into the salt form —COO⊖M⊕.

The polysiloxanes a) to be used according to the invention can be prepared in a manner analogous to that described above.

Preferred raw materials for the preparation of polysiloxanes according to the invention are, as described above, aminopolysiloxanes known per se, which are obtained by reacting unfunctionalized polysiloxanes, such as polydimethyl-polysiloxanes, preferably having a viscosity of 500 to 12500 mPas at 20° C., with an aminosilane of the formula

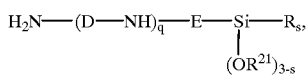

in which
s represents 0 or 1 and E, D, R and q have the above-mentioned meaning, and
$R^{21}$ represents methyl or ethyl,
preferably with N-(2-aminoethyl)-3-aminopropyldimethoxymethylsilane or N-(2-aminoethyl)-3-aminopropyldiethoxymethylsilane or 3-aminopropyldi(m)ethoxymethylsilane, in the presence of basic catalysts, preferably NaOH, KOH, trialkylammonium hydroxides or strongly basic ion exchangers. Polysiloxanes having a viscosity between 500 and 6000 mPas at 20° C. are particularly preferred as raw materials for the preparation of the aminopolysiloxanes.

Preferably, dimethylpolysiloxanes and the corresponding aminosilanes are used in an amount such that polysiloxanes which contain amino groups and whose base N content is 0.1% to 2.0% by weight, preferably 0.2 to 1.0% by weight and particularly preferably 0.25 to 0.8% by weight, are formed. The viscosity of the aminopolysiloxanes at 20° C. (D=100 s⁻¹) is preferably 50 to 2000 mPas, preferably 50 to 1000, particularly preferably 50 to 500, more preferably 50 to 200, mPas.

The polysiloxanes according to the invention are preferably obtained from the aminopolysiloxanes, optionally after reaction with $C_2$–$C_8$-alkylene oxides, preferably ethylene oxide and/or propylene oxide, by reaction with lactones, preferably γ-butyrolactone or caprolactone, and/or by reaction with cyclic carbonates, preferably ethylene carbonate, propylene carbonate or mixtures thereof, and simultaneous or subsequent reaction with dicarboxylic acid derivatives or dicarboxylic anhydrides, preferably maleic anhydride, succinic anhydride, phthalic anhydride, diethyl maleate or tetrahydrophthalic anhydride, and subsequent neutralization with bases of the carboxyl groups present in the product obtained. A reaction with dicarboxylic acid derivatives or anhydrides after the reaction with the lactone or cyclic carbonate is preferred. The subsequent dispersing in water gives the emulsions of the polysiloxanes.

It is also possible to react the hydroxyl groups present in the aminopolysiloxanes derivatized with alkylene oxides and/or lactones or carbonates with polyisocyanates, preferably only a part of the NCO groups reacting and no crosslinked products forming. The remaining NCO groups are preferably converted by reaction with hydroxycarboxylic or aminocarboxylic acids, converted into the salt with a base and correspondingly dispersed in water. In the last-mentioned case, radicals $R^1$ to $R^3$ containing urethane groups form.

Preferably 0.4 to 1.05 equivalents of lactone or cyclic carbonate are used for acylation per equivalent of basic amino group which is contained in the polysiloxane containing amino groups. The molar ratio of polycarboxylic anhydride (or ester) to base N is likewise 0.8:1 to 1.05:1. Preferably, 0.5 to 1.0 equivalent of lactone or cyclic carbonate is used per equivalent of nitrogen and then 0.9 to 1.05 equivalents of polycarboxylic anhydride are used. The reaction is preferably carried out without a solvent in the temperature range between 10° C. and 150° C., preferably between 30 and 120° C. In the case of viscous products, a solvent which is inert to anhydrides or lactones can be added to improve the handling or the solubility. The following may be mentioned by way of example: tetrahydrofuran, acetone, NMP, pyrrolidone, diethylene glycol dimethyl ether, DMSO, methyl ethyl ketone, ethyl acetate, chloroform and toluene. A reaction in acetone or ethyl acetate or without a solvent is preferred.

It is also preferable to distil off the solvent after the reaction with the lactone, before the further reaction with the anhydride is carried out.

It is furthermore preferable to use 0.4 to 1.05 equivalents of alkylene oxide and/or 0.4 to 1.05 equivalents of cyclic carbonate or lactone per equivalent of basic amino group which is contained in the aminopolysiloxane and to react the resulting hydroxypolysiloxanes with the dicarboxylic anhydride in the molar OH:anhydride ratio=1:1. Optionally, amino groups of the aminopolysiloxane raw material used which are still present are preferably reacted quantitatively with the dicarboxylic acid anhydride, simultaneously with the hydroxyl groups.

After the end of the reaction, the carboxyl groups present in the product are neutralized. 0.8 to 1.1 mol of a base are used per carboxyl equivalent. The reaction is carried out at 10° C. to 100° C., preferably at 30° C. to 80° C.

The neutralized reaction product preferably has a viscosity between 1000 and 100000 mPas, preferably between 2000 and 80000 mPas (measured at $D=10\ s^{-1}$), at room temperature (20 to 25° C.).

The dispersing in water is preferably effected by initially introducing the neutralized reaction product comprising polysiloxane containing carboxyl Groups and base and metering in water at 20° C. to 90° C., preferably at 20° C. to 70° C., at a rate such that thorough homogeneous mixing is always achieved. It is advantageous to add the water particularly slowly at the beginning. In the course of the metering, the rate of addition can be increased. The viscosity is highest when 30 to 60% of the total amount of the water have been added. In the case of highly viscous polysiloxanes, it is advantageous to add, before the addition of water, a solvent which can be readily removed by distillation after the dispersing. Particularly suitable solvents are tetrahydrofuran, isopropanol, acetone, methyl ethyl ketone, ethanol, cyclohexanol and isobutanol. Acetone and isopropanol and mixtures of acetone and cyclohexanol and mixtures of isopropanol and acetone are particularly preferred.

Suitable polyisocyanates are hexamethylene diisocyanate, isophorone diisocyanate, toluylene diisocyanate, 1-isocyanato-1-methyl-4-isocyanatomethyl-cyclohexane, dimers and trimers of hexamethylene diisocyanate which have uretdione structures or biuret or isocyanurate structures, and bis-1,4-(1-isocyanato-1,1-dimethyl-eth-2-yl)-benzene, bis-1,4-(1-isocyanato-2,2-dimethyleth-2-yl)-benzene, dimeryl diisocyanate and cyclohexylene 1,4-diisocyanate. Hexamethylene diisocyanate, isophorone diisocyanate and n-isocyanato-1-methyl-4-isocyanatomethylcyclohexane are preferred.

Suitable bases for neutralizing the carboxyl groups of the polysiloxane are, for example, sodium hydroxide solution, potassium hydroxide solution, ammonia -and primary, secondary or tertiary amines and alkanolamines. Ammonia, triethylamine, ethanolamine, diethanolamine, methyldiethanolamine, triethanolamine, morpholine, dibutylamine, cyclohexylamine, isopropanolamine, diethylamine, piperidine, N-methylpiperidine and 2,2',6,6'-tetramethyl-piperidin-4-ol are particularly preferred.

Suitable polycarboxylic anhydrides for the reaction with the hydroxy- and aminopolysiloxanes are maleic anhydride, succinic anhydride, norbornenedicarboxylic anhydride, phthalic anhydride, trimellitic anhydride, cyclohexanedicarboxylic anhydride, cyclohexenedicarboxylic anhydride and pyromellitic dianhydride, preferably maleic anhydride and succinic anhydride. Suitable polydicarboxylic acid derivatives are dimethyl malonate, diethyl malonate, diethyl maleate, dimethyl maleate and monoethyl maleate.

Suitable lactones for the reaction with the aminopolysiloxanes are propiolactone, γ-butyrolactone and ε-caprolactone, preferably ε-caprolactone.

Suitable carbonates for the reaction with the aminopolysiloxanes are ethylene carbonate and propylene carbonate, preferably ethylene carbonate.

Suitable alkylene oxides for the hydroxyalkylation of the aminopolysiloxanes are ethylene oxide, propylene oxide, butylene oxide and epoxycyclohexane, preferably ethylene oxide and propylene oxide.

Preferred aminopolysiloxanes as raw materials for the polysiloxanes according to the invention are those which have 2-aminoethyl-3-aminopropyl substituents or 3-aminopropyl substituents. Aminopolysiloxanes which have pendant functional groups and terminal trimethylsilyl groups are particularly preferred. In general, the substituents are randomly distributed over the main chain of the polysiloxane. Aminopolysiloxanes which carry amino groups at both chain ends and whose chain consists exclusively of dimethylsilyloxy units are furthermore preferred.

Polysiloxanes which contain carboxyl groups and are obtained by complete (100%) or virtually complete (>95%) reaction of the amino groups of the aminopolysiloxane are furthermore preferred. With nonstoichiometric use of the dicarboxylic anhydrides, in the case of the diaminofunctional polysiloxanes and incomplete (e.g. only 50%) reaction of the amino groups, undesired salt formation occurs between amino groups and carboxyl groups after the amide formnation, so that insoluble products or gels may form.

It is also possible to add paraffinic components to the polysiloxane before the emulsification with water and then to effect emulsification. It may be advantageous to use dispersing machines or gap homogenizers and high-pressure nozzles in order to increase the shear force. However, emulsification using a standard stirring unit is preferred since the products can be readily incorporated into water.

It is also possible to disperse the polysiloxane inversely by initially introducing the water and dispersing the neutralized polysiloxane active ingredient at 20 to 100° C. in the aqueous phase. However, inverse dispersing is not preferred.

The invention furthermore relates to aqueous dispersions of the polysiloxanes according to the invention. Preferably, these dispersions contain 1 to 60% by weight of polysiloxane and 40 to 99% by weight of water.

The polysiloxane emulsions are preferably characterized by a solids content of 30 to 50% by weight,

- a viscosity at 20° C. of less than 1000 mPas, preferably less than 500, particularly preferably less than 100 mPas,
- a mean particle size of 50 to 700 nm, preferably between 100 and 300 nm, particularly preferably between 100 and 250 nm,
- a pH of 6 to 8, preferably 6.5 to 7.5, and
- a content of carboxyl groups or of the salts thereof of 0.05 to 1.5 mmol/g of polysiloxane active ingredient.

They can also contain further additives, such as, for example, the paraffins, oils or emulsifiers mentioned below.

Suitable paraffins may be solid or liquid, for example those having a melting point of 10 to 90° C., liquid paraffins, mineral oils, white oils, natural oils or fats, such as fish oils, natural or synthetic waxes, such as polyethylene waxes, oxidized polyethylene waxes, polyisobutene waxes, carnauba wax or beeswax.

The amount of the paraffins, oils and waxes in the emulsion may be 0 to 70%, in particular 0 to 40%, based on polysiloxane a).

Suitable emulsifiers are in principle all surface-active compounds having a nonionic, anionic, cationic or ampho-teric character which are suitable for emulsification of the polysiloxanes and of the paraffins, oils and waxes and have as little an adverse effect as possible on the imparting of water repellency. Dimethyldodecylamine N-oxide, dimethyltetradecylamine N-oxide and N-($C_8$–$C_{30}$)-acylamino acids, such as N-oleylsarcosine, N-laurylsarcocine, N-stearylsarcosine, N-oleylaspartic acid, N-hexadecylaspartic acid, N-stearylaspartic acid or the corresponding derivatives of glutamic acid, fatty acids, such as oleic acid, lauric acid, tallow fatty alcoholates and their ethoxylation products and the sulphuric acid monoesters of the fatty alcohols and of the ethoxylation products of the fatty alcohols are particularly suitable. The acids are present in general in the form of the alkali metal, ammonium, trialkylammonium, or mono-, di- or trialkanolammonium salts. Usually, the polysiloxane emulsions contain 0.0 to 30% by weight, in particular 0.0 to 20% by weight, preferably 0.0 to 5% by weight, of emulsifiers or mixtures of said emulsifiers from the above-mentioned group.

Dispersions of polysiloxanes which contain no additional emulsifier from the above-mentioned group and whose active ingredient in neutralized form has a viscosity of 1000 to 100000 mPas at 20° C. and 100 sec$^{-1}$, preferably of 2000 to 80000 mPas, are particularly preferred.

The invention furthermore relates to a process for the preparation of the aqueous dispersions, which is characterized in that the polysiloxane according to the invention which contains carboxyl groups and whose COOH groups have been neutralized by bases and are present in the salt formn —COOM is dispersed in water, optionally in the presence of a suitable solvent, and any solvent present is then distilled off.

The dispersing in water is effected in such a way that the neutralized reaction product of polysiloxane containing carboxyl groups and base is initially introduced, preferably dissolved in a solvent, and water is metered in at 20° C. to 90° C., preferably at 20° C. to 70° C. at a rate such that thorough homogeneous mixing is always achieved. It is advantageous to add the water particularly slowly at the beginning. In the course of the metering, the rate of addition can be increased. If water is added too rapidly, irreversible deposition of the hydrophobic active ingredient may occur, while excessively slow addition presents no problems. The viscosity is highest on addition of 30 to 60% of the total amount of water. In the case of highly viscous silicone products, it is expedient to add a solvent before the start of the addition of water, which solvent can readily be removed by distillation after dispersing. Particularly suitable solvents are tetrahydrofuran, isopropanol, acetone, methyl ethyl ketone, ethanol, cyclohexanol and isobutanol. Acetone and isopropanol and mixtures of acetone and cyclohexanol are particularly preferred. It is also possible to add paraffinic components, oils or waxes to the polysiloxane before the emulsification with water and then to carry out emulsification. It may be advantageous to use dispersing machines or gap homogenizers and high-pressure nozzles in order to increase the shear force. However, emulsification using a conventional stirring unit is preferred since the products can be readily incorporated into water.

It is also possible to disperse the polysiloxane inversely by initially introducing the water and dispersing the neutralized polysiloxane active ingredient at 20 to 100° C. in the aqueous phase. However, inverse dispersing is not preferred.

It is furthermore possible to add to the polysiloxane additives prior to dispersing, in particular the paraffins (component $B_3$) or polyisocyanate adducts (component $B_4$) described below.

In a preferred variant of the water-repellent system, $B_1$ represents an anionic copolymer prepared by free radical copolymerization of (based in each case on monomer mixture)

α) 10–90 mol % of the ester of a monoethylenically unsaturated $C_3$–$C_5$-carboxylic acid based on an alcohol having 4 to 40 carbon atoms β) 90–10 mol % of a monoethylenically unsaturated carboxylic acid γ) 0–20 mol % of a monoethylenically unsaturated $C_4$–$C_6$-dicarboxylic anhydride δ) 0–30 mol % of a $C_2$–$C_8$-olefin (isobutene, diusobutylene) and ε) 0–10 mol % of a further comonomer from the group consisting of styrene, alpha-methylstyrene and vinyl esters of $C_1$–$C_8$-carboxylic acids and optionally subsequent partial reaction of the anhydride groups with a primary or secondary $C_1$–$C_{40}$-alcohol and/or a primary or secondary amine having one or two $C_1$–$C_{18}$-alkyl or alkenyl radicals, with the proviso that at least 20 mol % of the carboxyl groups corresponding to the anhydride groups are not reacted with alcohol and/or amine but are neutralized with a base, at least 50 mol % of the carboxyl groups being neutralized. Preferably, the component $B_1$ is present as an aqueous dispersion.

Description of the Component $B_1$

Suitable copolymers of the component $B_1$ are known per se and are prepared by free radical polymerization in solution or emulsion in the presence of polymerization initiators, optionally emulsifiers, chain transfer agents and customary additives, such as complexing agents.

For example, suitable copolymers are disclosed in U.S. Pat. No. 5,316,860. Polyacrylates prepared by polymerization of a monomer mixture comprising B1-a) 50–90% of a hydrophobic monomer, such as $C_{12}$–$C_{30}$-ester of (meth)acrylic acid, in particular cetyl-eicosyl (meth)acrylate or stearyl methacrylate, and B1-b) 10–50% of a hydrophilic monomer, such as acrylic acid or methacrylic acid are particularly preferred.

Other suitable copolymer dispersions are disclosed in DE-A 43 34 796. Reaction products of B1-A) terpolymers having an average molar mass $M_n$ of 5000 to 60000, of B1-c) maleic anhydride, B1-d) 80–120 mol %, based on component B1-c), of diisobutene and B1-e) 1–12 mol %, based on component B1-c), of at least one monomer of the formula

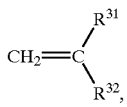

in which
$R^{31}$ denotes hydrogen or methyl,
$R^{32}$ denotes hydrogen, methyl, ethyl, —$OR^{33}$,

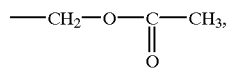

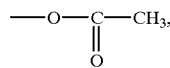

optionally $C_1$–$C_4$-alkyl-substituted phenyl or hydroxymethyl and $R^{33}$ denotes $C_1$–$C_4$-alkyl, with B1-B) aliphatic fatty alcohols having a chain length $C_6$ to $C_{24}$ and B1-C) subsequent reaction with a base, preferably KOH, NaOH, $NH_3$ or amines, are particularly preferred.

Terpolymers of maleic anhydride, diisobutene and styrene which have been reacted with $C_{12}$–$C_{22}$ fatty alcohols and NaOH are also particularly preferred.

Also suitable are anionic copolymer dispersions prepared by free radical copolymerization of B1-f) 30–85 mol % of the ester of a monoethylenically unsaturated $C_3$–$C_5$-carboxylic acid based on an alcohol having 4 to 40 carbon atoms B1-g) 70–15 mol % of a monoethylenically unsaturated carboxylic acid B1-h) 0–20 mol % of a monoethylenically unsaturated $C_4$—$C_6$-dicarboxylic anhydride B1-i) 0–30 mol % of a $C_2$–$C_8$-olefin (isobutene, diisobutylene) and B1-j) 0–10 mol % of a further comonomer from the group consisting of styrene, alpha-methylstyrene and vinyl esters of $C_1$–$C_8$-carboxylic acids and optionally subsequent partial reaction of the anhydride groups with a primary or secondary $C_1$–$C_{40}$-alcohol and/or a primary or secondary amine having one or two $C_1$–$C_{18}$-alkyl or alkenyl radicals, with the proviso that at least 20 mol % of the carboxyl groups corresponding to the anhydride groups are not reacted with alcohol and/or amine but are neutralized with a base, at least 50 mol % of the carboxyl groups being neutralized.

Suitable monomers for the preparation of the components B are: methacrylic acid, acrylic acid, methyl methacrylate, methyl acrylate, butyl acrylate, ethyl acrylate, 2-ethylhexyl acrylate, octyl methacrylate, octyl acrylate, tallow fatty alcohol methacrylate, tallow fatty alcohol acrylate, stearyl methacrylate, stearyl acrylate, hexadecyl methacrylate, hexadecyl acrylate, dodecylmethacrylate, dodecyl acrylate, eicosanyl methacrylate, eicosanyl acrylate, esters of guerbet alcohols with methacrylic acid or acrylic acid, styrene, alpha-methylstyrene, maleic anhydride, diisobutylene or isobutene, vinyl acetate and vinyl propionate.

Preferred components $B_1$ are amphiphilic copolymers of a hydrophobic monomer from the group consisting of stearyl methacrylate, hexadecyl methacrylate, eicosanyl methacrylate, dodecyl methacrylate, octyl methacrylate and 2-ethylhexyl methacrylate and a hydrophilic monomer from the group consisting of methacrylic acid, acrylic acid, maleic anhydride and optionally further comonomers, such as styrene, diisobutylene or isobutene.

The carboxyl groups in the copolymer may be present in the form of the free acids or as salts. Bases, such as NaOH, KOH, sodium carbonate, ammonia or amines, such as triethylamine, ethanolamine, triethanolamine, diisopropylamine, diethanolamine, N-methyldiethanolamine, octylamine, etc., may be used for the neutralization. 0.5–1.0 equivalent, based on carboxyl groups, of base is preferably used for the neutralization.

Copolymers which are prepared by copolymerizing a monomer mixture comprising

20–90% by weight of a hydrophobic monomer, in particular stearyl methaorylate, hexadecyl methacrylate, eicosanyl methacrylate, dodecyl methacrylate, octyl methacrylate or 2-ethylhexyl methacrylate, and 80–10% by weight of a hydrophilic monomer, in particular methacrylic acid, acrylic acid or maleic anhydride, and 0–30% by weight of a further comonomer from the group consisting of styrene, alpha-methylstyrene and diisobutylene are particularly preferred.

In a particularly preferred embodiment, polyacrylate dispersions which were prepared by free radical polymerization in the presence of a chain transfer agent and whose carboxyl groups have been neutralized with a base are used, the monomer mixture used consisting of 60 to 85% by weight of stearyl methacrylate or $C_{17.4}$-methacrylate and 15–40% by weight of acrylic acid. Dispersions which are prepared by dispersion in the presence of the component $B_3$ described below are also preferred. In this embodiment, especially white oil or a liquid $C_{14}$–$C_{17}$-liquid paraffin or a wax melting at 30–40° C. is particularly preferred as component $B_3$. The amount of component $B_3$, based on the active ingredient comprising $B_1$+$B_3$, is preferably between 30 and 80% by weight, and the amount of solid resin $B_1$ is between 20 and 70% by weight.

Particularly preferred polyacrylate dispersions have an average molar mass of 2000 to 50000 g/mol, preferably 2000 to 20000 g/mol. Such dispersions can be prepared, for example, according to EP 579.267, EP 498 634 and U.S. Pat. No. 5,348,807.

Preferably, the dispersions of component $B_1$ have a solids content of 10 to 60% by weight, preferably 20 to 50% by weight.

Suitable polyacrylate dispersions are known per se. Examples of particularly suitable polyacrylate dispersions are the products of the LUBRITAN®/LEUKOTAN® series, in particular Lubritan® WP, Leukotan® NS3, Lubritan® XE/XE 3, Lubritan® AS and Lubritan® SP, obtainable from Rohm and Haas.

It has surprisingly been found that the polyacrylates (component B1) in combination with the components $B_3$ impart substantially better hydrophobic character and a better handle to the leather than the polyacrylate dispersions alone if they are used in the water-repellent system together with the polysiloxane a).

The invention therefore also relates to a mixture containing an anionic copolymer and a paraffin, which is used before or together with the polysiloxane a).

A preferred component $B_2$ is a polyaspartic acid derivative having a molecular weight, determined as the number average, of 700 to 30000, preferably 1300 to 16000, obtainable by reacting B2-A) polysuccinimide having a molecular weight, determined as the number average, of 500 to 10000, preferably 500 to 6000, in particular 1000 to 4000, obtainable by reaction of maleic anhydride and $NH_3$ solution and subsequent condensation, with B2-B) 5 to 90, preferably 20 to 80, mol %, based on succinimide units of the polysuccinimide, of primary and/or secondary amine whose nitrogen substituents contain 1 to 60, preferably 1 to 36, carbon atoms which may be substituted by hydroxyl radicals and/or interrupted by oxygen atoms, at least 2.5 mol %, preferably at least 15 mol %, in particular at least 30 mol %, of the nitrogen substituents of the amine containing at least 12 carbon atoms, and B2-C) with 95 to 10 mol %, preferably 80 to 20 mol %, of a ring-opening base in the presence of water.

Suitable components $B_2$ are known per se and are described in DE 195 28 782 and EP 842 300.

Description of Component $B_2$

The polysuccinimide B2-A) serving as a starting material for the polyaspartamides to be used according to the invention is disclosed in, for example, EP 842 300.

A suitable process starts from maleic anhydride and ammonia, in which the reaction product of maleic anhydride and $NH_3$ is subjected to thermal condensation in the presence of a solvent (cf. EP 842 300). The polysuccinimide formed is then present in solution.

The polysuccinimide serving as a starting compound can also be prepared by thermal dehydration of polyaspartic acid.

In a preferred embodiment, polyaspartic acid derivatives contain repeating aspartic acid units of the following structures

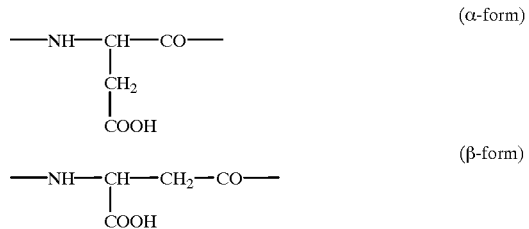

In general, the amount of the β-form is more than 50%, in particular more than 70%, based on the sum of α-form+β-form.

In addition to these repeating aspartic acid units, further repeating units may be present, e.g.

malic acid units of the formula

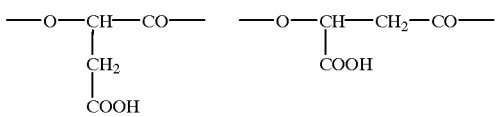

maleic acid units of the formula

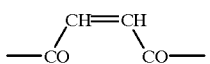

fumaric acid units of the formula

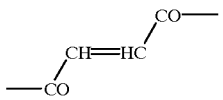

The "further" repeating units may be present in the polyaspartic acid in amounts of up to 100% by weight, based on the sum of α- and β-form of the aspartic acid units.

Preferred polyaspartic acids have molecular weights, determined as the weight average by gel permeation chromatography (calibrated with polystyrene), of 500 to 10000, preferably 1000 to 5000, in particular 2000 to 4000.

The dehydration of polyaspartic acid to polysuccinimide can be carried out at elevated temperature, preferably at 100 to 240° C., optionally in the presence of a catalyst, e.g. in the presence of 0.01 to 1% by weight, based on polyaspartic acid, of an acidic catalyst, such as sulphuric acid, phosphoric acid or methanesulphonic acid.

Preferred amines B2-B) for the reaction with the polysuccinimide B2-A) comprise secondary and—preferably—primary amines, such as, for example, monofunctional polyetheramines having a primary or secondary amino group, such as α-methyl-ω-amino-polyoxyethylene, N,N-dimethylethylenediamine, methylamine, diethylarnine, butylamine, stearylamine, tallow fatty amine, oleylamine, undecylamine, dodecylamine, octylamine, hexylamine, eicosanylarnine, hexadecylamine, 2-ethyl-hexylamine, morpholine, ethanolamine, diethanolamine, bis-2-hydroxy-propylamine, bis-3-hydroxy-propylamine, 2- or 3-hydroxypropylamine, ethoxy-ethylamine, ethoxy-ethoxy-ethylamine, butoxy-ethoxy-ethoxy-ethylamine, 2-methoxy-ethylamine, tetrahydrofurfurylamine, 5-aminopentanol, benzylamine, 4-aminocyclohexylamine, N-methylaminoethyl-sulphonic acid sodium salt, dehydroabietylamine, stearyloxypropylamine,

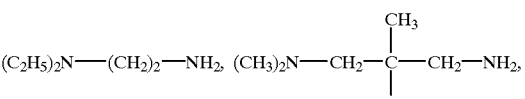

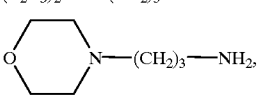

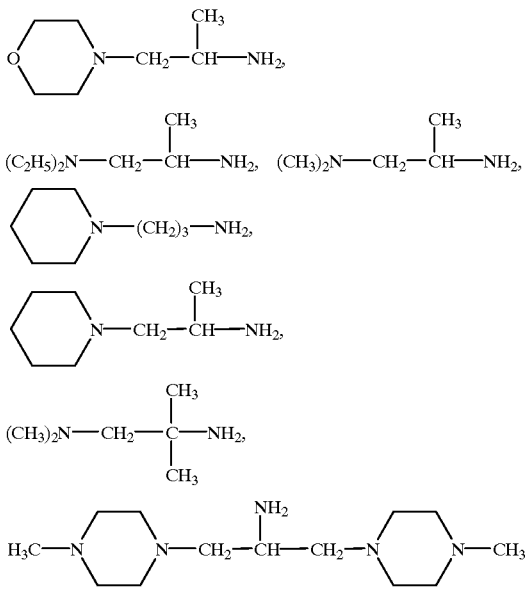

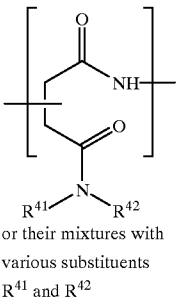

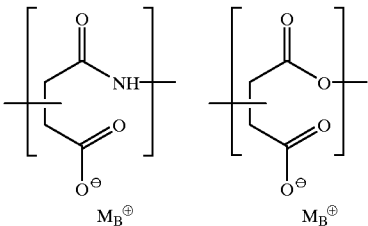

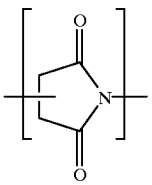

The reaction of the polysuccinimide with the amine is disclosed in EP 0 842 300 and is preferably carried out in organic solvents which are inert under reaction conditions. Suitable as such are, for example, lactams, such as caprolactam, N-miethylpyrrolidone and N-methylcaprolactam, polyalkylenediols and their mono- and diethers, such as ethylene glycol, diethylene glycol, triethylene glycol, ethylene glycol dimethyl and diethyl ether and diethylene glycol monoethyl ether, and dimethylformamide and dimethyl sulphoxide. The solvent content will not as a rule exceed 30% by weight, based on the total reaction mixture.

The reaction i s carried out in a temperature range from 20 to 160° C., the reaction times being between 2 and 72 hours. The product can be isolated by removing the solvent by distillation or by precipitating the product in a nonsolvent, such as acetone, methanol, ethanol, water or isopropanol, and then, if desired, dried.

The polyaspartamides to be used according to the invention can be prepared from the reaction product of B2-A) and B2-B) by opening the remaining incorporated succinimide rings.

Suitable ring-opening bases B2-c) are both alkali metal hydroxides, carbonates and bicarbonates, in particular sodium and potassium hydroxide and sodium carbonate, and ammonia and amines—including the amines B2-B).

According to a preferred embodiment, maleic acid and maleic anhydride and aqueous ammonia can be mixed in the molar ratio 1:0.75 to 1:1.5 and water distilled off. When the polysuccinimide has reached the desired molecular weight, optionally with concomitant use of an organic solvent, such as diethylene glycol, pyrrolidone, N-methylpyrrolidone, amine B2-B) is metered in and reacted at 130 to 160° C. A reaction time of 3 to 18, preferably of 4 to 8, hours is as a rule sufficient for the reaction with amine B2-B). Optionally, an organic solvent may be added. The polyaspartamide which is to be used according to the invention and can be readily dispersed in water with simultaneous opening of the remaining incorporated succinimide rings with ring-opening base B2-c) is formed directly, the concomitant use of customary dispersants being advantageous.

The polyaspartamides to be used according to the invention contain, in an idealized form, repeating structural units of the formulae in which
R$^{41}$, R$^{42}$ denote hydrogen or one of the radicals designated above as nitrogen substituents, with the proviso that at least one of the two radicals is not hydrogen, and
M$_B^+$ represents H$^+$ or an alkali metal ion, an NH$_4$ ion or a primary, secondary or tertiary aliphatic ammonium radical which preferably carries at least one C$_1$–C$_{22}$-alkyl or C$_1$–C$_{22}$-hydroxyalkyl group.

Suitable radicals M$_B^+$ are, for example, hydroxyethylammonium, dihydroxy-ethylammonium, trishydroxyethylammonium, triethylammonium, ammonium, butyl-ammonium, benzyltrimethylammonium, morpholinium, stearylammonium and oleyl-ammonium.

The structural units I are contained in the polymer preferably in an amount of 5 to 90, in particular 20 to 80, mol %, based on all repeating units. Preferred polyaspartamides contain on average at least one C$_{12}$–C$_{22}$-alkyl and/or C$_{12}$–C$_{22}$-alkylene radical per structural unit I.

The structural units II are contained in the polymer preferably in an amount of 95 to 10, in particular 80 to 20, mol %, based on all repeating units. Polyaspartamides whose carboxyl groups are present in partly neutralized form are particularly preferred. The preferred degree of neutralization is 10 to 80, preferably 20 to 60%.

The structural units III are contained in the polymer in an amount of 0 to 5 mol %, based on all repeating units. Preferred polyaspartamides contain less than 1 mol % of the structural units III.

Preferred nitrogen substituents R$^{41}$, R$^{42}$, independently of one another, comprise, for example, optionally hydroxyl-substituted C$_1$–C$_{22}$-alkyl or C$_2$–C$_{22}$-alkenyl groups, such as hydroxyethyl, hydroxypropyl, methyl, ethyl, butyl, hexyl, octyl, octenyl, decyl, undecyl, undecenyl, dodecyl, tetradecyl, hexadecyl, oleyl, octadecyl or 12-hydroxy-octadecenyl, $C_5$–$C_{10}$-cycloalkyl radicals, such as cyclohexyl, $C_{12}$–$C_{30}$-radicals interrupted by oxygen atoms, such as stearoyloxyethyl or stearyloxyethoxyethyl, and are derived from the above-mentioned amines $B_2$-B).

Nitrogen substituents interrupted by oxygen atoms are best introduced by using corresponding aminoethers.

The polyaspartamides to be used according to the invention are self-dispersing, particularly if the amount of structural units I is less than 50 mol %. However, external dispersants may also be concomitantly used.

Preferred dispersants comprise, for example, $C_8$–$C_{18}$-n-alkylsulphates, $C_8$–$C_{18}$-n-alkyl-benzenesulphonates, $C_8$–$C_{18}$-n-alkyl-trimethyl-ammonium salts, n-di-$C_8$–$C_{18}$-alkyl-dimethyl-ammonium salts, $C_8$–$C_{18}$-n-alkyl-carboxylates, $C_8$–$C_{18}$-n-alkyldimethylamine oxides and—preferably—oligoethylene glycol mono-$C_6$–$C_{18}$-alkyl ethers having on average 2 to 30 ethoxy groups per molecule. The n-alkyl radicals may also be replaced by partially unsaturated linear aliphatic radicals. Particularly preferred dispersants are oligoethylene glycol mono-$C_{10}$–$C_{14}$-alkyl ethers having on average 4 to 12 ethoxy groups per molecule, in particular oligoethylene glycol mono-$C_{12}$-alkyl ethers having on average 8 ethoxy groups per molecule.

Preferred dispersants furthermore comprise oleic acid, oleic acid sarcosides, ricinoleic acid, stearic acid, fatty acid partial esters of polyols, such as glycerol, trimethylolpropane and pentaerythritol, and their acylation, ethoxylation and propoxylation products, e.g. glyceryl monostearate and monooleate, sorbitan monostearate and monooleate, sorbitan tristearate and trioleate and their reaction products with dicarboxylic anhydrides, such as succinic anhydride, maleic anhydride, phthalic anhydride or tetrahydrophthalic anhydride, reaction products of bis-(hydroxymethyl)-tricyclodecane and maleic anhydride or succinic anhydride and their derivatives, preferably in the form of their alkali metal or ammonium salts.

Particularly preferred dispersants are salts of long-chain fatty acids, preferably oleic acid and an amino alcohol, preferably hydroxyethylamine, bishydroxyethylamine or trishydroxyethylamine.

The dispersion of the polyaspartamides to be used according to the invention can be formed by dispersing the polyaspartamides in an aqueous dispersant solution, preferably with heating to temperatures of 40 to 95° C., with stirring.

In general, it is advisable to disperse the polyaspartamides to be used according to the invention without intermediate isolation, directly from the reaction mixture, which optionally contains organic solvent. Thus, for example, the dispersant can be added to the reaction mixture and an aqueous solution of the ring-opening base $B_2$-c) can be metered in while stirring at temperatures of 70 to 130° C., so that a mixing temperature of 70 to 95° C. is established, and optionally the organic solvent can be distilled off. Conversely, it is of course also possible to disperse the reaction mixture inversely in aqueous dispersant solution or a mixture of reaction mixture and dispersant in water. It is also possible to dispense with the removal of the solvent.

The use of ring-opening bases B2-c) for establishing the pH after dispersing is also preferred. pH values of 5.5 to 11, especially of 6.0 to 9, are particularly preferred. It is also preferable to subject the dispersion to bleaching with oxidizing agents. Hydrogen peroxide, ammonium persulphate or sodium sulphate is particularly suitable. After the end of the bleaching, unconsumed oxidizing agent is deactivated with a reducing agent or by enzymatic decomposition. Suitable reducing agents are sodium bisulphite, sodium dithionite and the corresponding potassium and lithium salts or an enzymatic reducing agent (BAYREDUKT® EPK).

The dispersant content is in general not more than 30, preferably 3 to 15, % by weight, based on the prepared dispersion.

The solids content of the dispersionsis 5 to 70% by weight, preferably 20 to 50% by weight. The mean particle size of the dispersed polyaspartamides is in general 50 to 1000, preferably 50 to 700 and in particular 50 to 400 nm.

Particularly in the case of solids contents above 45% by weight, the dispersions may be present in the form of pastes, which however can readily be diluted with water. Preferred dispersions having a solids content of 30–40% by weight are present as a rule as low-viscosity emulsions which have a viscosity of <1000 mPas at 20° C. The pH of the dispersions is between 5 and 10, preferably in the pH range between 5 and 9.

A particularly preferred component $B_2$ is obtainable by

B2-a) reacting maleic anhydride, optionally in an inert solvent, with ammonia in the molar ratio 1:1.0 to 1:1.3 and effecting thermal condensation, the water formed being distilled off, B2-b) reacting the product from B2-a) with at least one amine of the formula

(I)

in which $R^{41}$ and $R^{42}$ have the stated meaning, 0.2 to 0.5 mol of amine (I) being used per 1 mol of maleic anhydride, and B2-c) dispersing the reaction product, optionally in the presence of a dispersant, in an aqueous phase which contains a base, and adjusting the product in solids content, viscosity, pH, particle size and colour, depending on the intended use, and optionally subjecting it to bleaching.

A preferred component $B_3$ is a paraffinic hydrocarbon which optionally may be substituted by hydroxyl and/or carboxyl groups (white oil 285, liquid paraffin, paraffin wax, montan wax, carnauba wax, oxidized polyethylene, long-chain fatty alcohols, such as guerbet alcohols, fatty acids, fatty acid esters, phospholipids), the paraffinic hydrocarbon preferably giving a stable dispersion together with the component $B_1$ and/or $B_2$.

Description of the Component $B_3$

Suitable components $B_3$ are, for example, paraffinic hydrocarbons, such as $C_{10}$–$C_{60}$-paraffins, in particular $C_{14}$–$C_{17}$-liquid paraffins, white oil, waxes, fatty alcohols, such as stearyl alcohol, oleyl alcohol or mixtures thereof, such as tallow fatty alcohol, and moreover commercial wool wax alcohol, commercial carnauba wax, commercial polyethylene wax, montan wax, guerbet alcohols and reaction products of the fatty alcohols with dicarboxylic anhydrides, preferably maleic anhydride and succinic anhydride, fatty acids, such as commercial dimeric fatty acids, it being possible for the carboxyl groups contained in the waxes to be present in free form or in neutralized form as salts. $C_{14}$–$C_{17}$-Liquid paraffins, white oil and waxes having a softening point between 25 and 60° C. are particularly preferred.

Bases, such as NaOH, KOH, sodium carbonate, ammonia or primary, secondary or tertiary amines or amino alcohols, are suitable for the neutralization. KOH, NaOH, ammonia, ethanolamine, morpholine, diethanolamine, triethylamine and triethanolamine are particularly preferred.

The components $B_3$ are preferably present as aqueous dispersions. The solids content of such dispersions is 5 to 60% by weight, preferably 10 to 35% by weight.

It is furthermore particularly preferable to use the component $B_3$ together with components $B_1$ and $B_2$. For this purpose, the component $B_3$ is preferably added to component $B_1$ and/or $B_2$ and converted into a stable dispersion by using high shear forces with the aid of customary dispersing machines, dissolvers, homogenizers or ultrasonic apparatuses.

Preferably, such dispersions have the following composition:

1 to 50% by weight of component $B_1$ (calculated in each case as solids content) and/or component $B_2$, 0 to 50% by weight of component $B_3$ (calculated in each case as solids content), 0 to 99% by weight of water (total=100%).

Mixtures of components $B_3$ and $B_1$ are particularly preferred.

Particularly preferred mixtures of component $B_1$ and component $B_3$ are those which have the following composition:

3 to 30% by weight (based on solids content) of $B_1$, 10 to 40% by weight (based on solids content) of $B_3$, 30 to 87% by weight of water (total=100%).

Mixtures of component $B_1$ and component $B_3$ having a solids content of 10 to 70% by weight, preferably 20 to 50% by weight, are very particularly preferred.

It is also preferable that the component $B_3$ as such is added to a component $B_1$ and/or $B_2$, prior dispersing of the component $B_2$ in water not being required.

A preferred component $B_4$ is a reaction product of $B_4$-a) an organic polyisocyanate $B_4$-b) 0.0 to 0.9 equivalent of $C_6$–$C_{24}$-alcohol, preferably $C_{12}$–$C_{18}$-alcohol, per equivalent of NCO or latent NCO contained in $B_4$-a), $B_4$-c) 0.1 to 1.0 mol of cyanamide per equivalent of NCO or latent NCO contained in $B_4$-a) and $B_4$-d) ammonia or volatile amine as neutralizing agent for the cyanamide groups, the reaction products being free of polyester or polyether groups and free of halogen atoms.

The term "cyanamide groups" in the context of the invention comprises functional groups of any type, provided that they contain groups of the formula

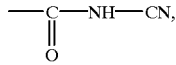

i.e. for example, cyanourea groups

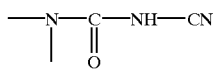

or cyanoaminocarbonylurea groups

and groups containing the salts of these compounds and of the formula

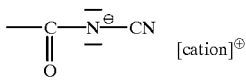

Preferred isocyanate adducts (component $B_4$) are also the anionically modified polyureas which are described in DE-A 41 33 572 and EP-A 0 538 649 and in EP-A 0 814 102 (Examples 1–3) and which are based on I. a) organic polyisocyanates and II. polyfunctional NCO-reactive compounds from the series comprising b) polyhydroxy compounds, c) polyamines, d) amino alcohols and optionally III. monofunctional NCO-reactive compounds e) and optionally IV. water f), which contain anionic N-cyanoaminocarbonylurea groups of the formula

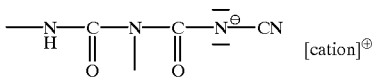

incorporated into the polymer chain and optionally terminal anionic cyanourea groups of the formula

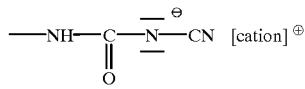

wherein the ratio of groups incorporated into the polymer chain to terminal groups is higher than 1:1 and wherein [cation]$^\oplus$ represents an alkali metal ion or an optionally substituted ammonium ion.

Preferred isocyanate adducts (component $B_4$) which are described in EP-A 0 814 102 are also the graft copolymers of unsaturated monomers on cyanamide groups containing, anionically modified polyurethane urea dispersions as the graft substrate, which are in turn obtainable by the reaction of NCO prepolymers with cyanamide.

When component $B_4$ is used as an emulsifier, very soft leathers having outstanding handle are formed.

A substantial advantage of component $B_4$ is that it reacts in the leather to give a water-insoluble (nonhydrophilic) dimer or oligomer and consequently is neither washed out nor migrates significantly as soon as this reaction is complete and loses its emulsifying effect.

Description of Component $B_4$

Component $B_4$ is disclosed for example in DE-A 41 33 572 or EP 0 814 102 and is preferably obtained by reacting a polyurea containing oxadiazinetrione structures of the formula (ii)

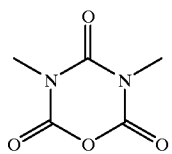

and/or uretdione units of the formula (i)

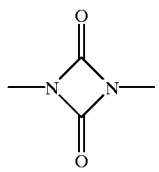

with a cyanamide salt of the formula H—NE$^{\ominus}$—CN [cation]$^{\oplus}$, wherein [cation]$^{\oplus}$ represents an alkali metal ion or an optionally substituted ammonium ion. Particularly preferred anionically modified polyureas are for example the polyureas according to Examples 1 to 5 of DE-A 41 33 572 and according to Examples 1 to 3 of EP-A 0 814 102.

The component $B_4$ is disclosed, for example, in DE 43 30 378 and is preferably prepared by reaction of NCO groups in polyisocyanates with a $C_6$–$C_{24}$-alcohol and then with cyanamide and subsequent neutralization with ammonia or volatile bases. The reaction products no longer contain free NCO groups and are soluble in water or emulsifiable in water. The reaction with the $C_6$–$C_{24}$-alcohol can, if required, also be omitted.

The anionic polyisocyanate adducts preferably have average molar masses (number average) of less than 5000 g/mol, preferably of 300 to 3000 g/mol.

Suitable polyisocyanates are in particular aliphatic polyisocyanates having at least 2 free isocyanate groups per molecule. Diisocyanates $T(NCO)_2$ are preferably used, T representing a divalent aliphatic hydrocarbon radical having 4 to 12 carbon atoms or a cycloaliphatic or aromatic radical having 6 to 15 carbon atoms or an araliphatic radical having 7 to 15 carbon atoms. The following may be mentioned by way of example: butylene diisocyanate, hexamethylene diisocyanate (HDI), isophorone diisocyanate (IPDI), diisocyanato-cyclohexane, 4-isocyanato-4-methyl-1-isocyanatomethyl-cyclohexane, bis-cyclohexylmethane 4,4'-diisocyanate ($H_{12}$ MDI), nonyl triisocyanate, 1,4-diisocyanatobenzene, 2,4-diisocyanatotoluene (2,4-TDI), 2,6-diisocyanatotoluene (2,6-TDI), p-xylylene diisocyanate, 4,4'-, 2,2'- and 2,4'-diisocyanato-diphenylmethane (MDI) and mixtures thereof.

The customary polyisocyanates which are known per se in polyurethane chemistry, have a higher functionality and are obtainable, for example, by trimerization of hexamethylene diisocyanate or isophorone diisocyanate or mixtures thereof and which contain isocyanurate units as additional structural units and may have an NCO functionality of 2 to 3.5 are also preferably used. Such trimers are commercially available (BAYER AG, products of the DESMODUR® series).

Commercially available modified polyisocyanates which are known per se, are obtained by catalytic dimerization of hexamethylene diisocyanate and contain additional uretdione structural units (i)

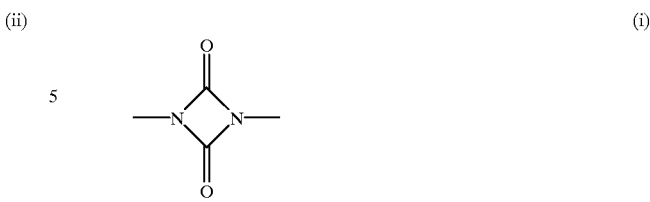

and optionally also isocyanurate structures are also suitable. Polyisocyanates which contain oxadiazinetrione structural units (ii)

and which are derived from hexamethylene duisocyanate are also suitable. Modified polyisocyanates which are known per se, contain carboduimide, urea, urethane, allophanate or biuret groups and may also have an NCO functionality between 2.0 and 3.5 and are derived from hexamethylene diisocyanate are furthermore suitable.

Particularly preferred HDI polyisocyanates containing biuret groups are those which have an NCO fuinctionality of 2.5 to 3.5, for example DESMODUR® N 3200 (Bayer AG).

The polyisocyanates described above can also be used as a mixture.

Diisocyanates in turn, of the formulae (iii) and/or (iv)

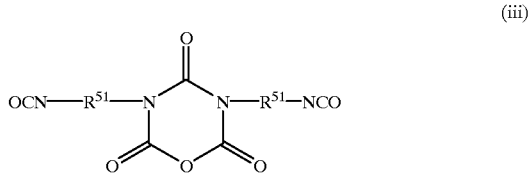

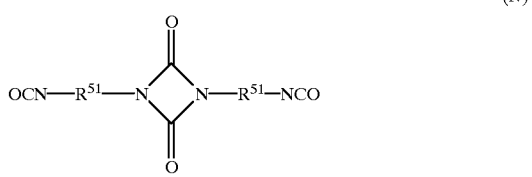

in which the radicals $R^{51}$, independently of one another, represent the divalent radical of an aliphatic hydrocarbon having 1 to 15 carbon atoms, of a cycloaliphatic hydrocarbon having 3 to 15 carbon atoms, of an araliphatic hydrocarbon having 7 to 15 carbon atoms or of an aromatic hydrocarbon having 6 to 12 carbon atoms, are suitable as components for introducing oxadiazinetrione and/or uretdione structural units of the formulae (i) and (ii), respectively.

Examples of such polyisocyanates $B_4$-a) are 1,3-bis-(5-isocyanato-1,3,3-trimethylcyclohexyl-methylene)-2,4-dioxo-1,3-diazetidine; 1,3-bis-(3-isocyanato-4-methylphenyl)-2,4-dioxo-1,3-diazetidine; 1,3-bis-(6-isocyanato-hexyl)-2,4-dioxo-1,3-diazetidine; 3,5-bis-(5-isocyanato-1,3,3-trimethyl-cyclohexyl-methylene)-2,4,6- trioxo-tetrahydro-1,3,5-oxadiazine; 3,5-bis-(4-isocyanato-cyclohexyl)-2,4,6-trioxo-tetrahydro-1,3,5-oxadiazine and 3,5-Bis-(6-isocyanato-hexyl)-2,4,6-trioxo-tetrahydro-1,3,5-oxadiazine (Desmodur® LB 202, Bayer AG).

Among the isocyanates of the formulae (iii) and (iv), those of the oxadiazinetrione series (iii) are preferably used, particularly preferably 3,5-bis-(6-isocyanatohexyl)-2,4,6-trioxo-tetrahydro-1,3,5-oxadiazine.

Since isocyanate groups are lost as a result of reaction with the alcohol $B_4$-b), polyisocyanates having more than 2 isocyanate groups are very particularly preferred. These isocyanates include isocyanurates, biurets, trisurethanes (and their analogues having a higher functionality) of TDI, IPDI, MDI, HDI and H12-MDI, of 1,4-diisocyanatocyclohexane, etc. Owing to the better lightfastnesses, here too the aliphatic polyisocyanates are very particularly preferred.

Examples of suitable polyisocyanates are trimers of hexamethylene diisocyanate, 1,3-bis-(6-isocyanatohexyl)-2,4-dioxo-1,3-diazetidine, 3,5-bis-(6-isocyanatohexyl)-2,4,6-trioxo-tetrahydro-1,3,5-oxadiazine (DESMODUR® LB 202). If the reaction with a $C_6$–$C_{24}$-alcohol is carried out, the polyisocyanates having a functionality greater than 2 are preferred because a part of the NCO functionality is lost as a result of the reaction with the alcohol.

Suitable $C_6$–$C_{24}$-alcohols are alkanols, such as n-hexanol, n-octanol, 2-ethylhexanol, dodecanol, cetyl alcohol, stearyl alcohol, hydrogenated tallow fatty alcohols or guerbet alcohols, or alkenols, such as oleyl alcohol, tallow fatty alcohol, cyclohexenol, butenol, hexenol, hexadecenol or octadecenol.

Suitable bases for neutralizing the cyanamide groups $B_4$-d) are ammonia and volatile amines, preferably tertiary amines having up to 12 carbon atoms, such as triethylamine, trimethylamine, triisopropylamine, tri-n-butylamine, N,N-dimethylaminoethanol, N-methylmorpholine, pyridine and triisopropanolamine. Ammonia and triethylamine are particularly preferred.

The component $B_4$ is prepared by reacting a polyisocyanate $B_4$-a), optionally partially, with a $C_6$–$C_{24}$-fatty alcohol $B_4$-b) and reacting the modified polyisocyanate or the unmodified polyisocyanate in water in the presence of cyanamide $B_4$-c) and neutralizing agent (base) $B_4$-d), or in the presence of a cyanamide neutralized with a base, to give the desired end product.

The reaction temperature is in general between 20 and 100° C., preferably between 30 and 60° C. The reaction is complete when the end product no longer has any free NCO groups. In a preferred embodiment 0 to 0.7 mol, particularly preferably 0 to 0.3 mol, of alcohol $B_4$-a) per NCO equivalent of polyisocyanate $B_4$-b) is used. The remaining NCO groups are then further reacted with cyanamide $B_4$-c) and neutralizing agent $B_4$-d). It is possible to use cyanamide and neutralizing agent in excess. In this case, the other NCO groups react with the alcohol or water.

Dispersions or solutions $B_4$ are obtained, depending on the presence or type and/or proportion of the fatty alcohol component. The solids content of this solution or dispersion is preferably 5 to 70% by weight, particularly preferably 20 to 60% by weight. The remainder is water.

A reaction product of a hexamethylene diisocyanate trimer containing biuret groups (Desmodur®3200) or of a hexamethylene diisocyanate trimer containing isocyanurate groups (Desmodur® N 3300, N 3600) and 1 mol of cyanamide per equivalent of NCO and 1 mol of triethylamine per equivalent of cyanamide is particularly preferred. The product is dispersed in water, a 40–60, in particular 50–60, % strength solution being obtained.

The component $B_4$ is preferably present as an aqueous dispersion or solution.

The component $B_4$ has the following properties:

on drying and giving up its opposite ion, the compounds dimerize or oligomerize and lose their ionic character;

they thus also lose their dispersing properties; polymers dispersed therewith are precipitated;

if they have radicals of relatively long-chain alcohols $B_4$-b), they can support in particular hydrophobic properties;

if the products $B_4$ have a functionality greater than 2, they act as crosslinking agents.

They are particularly suitable for:

retanning of leather with softening and optionally imparting of hydrophobic properties;

reinforcing the water-repellency effect when components $B_1$) to $B_4$) and polysiloxanes a) are used;

use as a dispersion stabilizer for other customary leather auxiliaries;

use as an emulsifier for silicones.

If the components $B_4$ are used as emulsifiers for component a) (polysiloxane containing carboxyl groups), they can be used in amounts of 0.1 to 100% by weight (solid reaction product), based on the amount of the polysiloxane active ingredient. The use of 0.1 to 50, preferably 0.1 to 10, % by weight (solid reaction product), based on the amount of the polysiloxane active ingredient, is in general sufficient.

The mixtures to which the components $B_4$ have been added can be converted into a dispersion in a simple manner (by stirring or pouring into the liquor used). Component $B_4$ is generally poured into the retanning liquor or the water-repellent liquor which contains the component a); the dispersion is taken up as a result of the rotary movement of the drum or of the tanning machines. The pH of the retanning liquor or of the leather should be above 4, preferably above 5 to 5.5. Of course, synthetic tanning agents, polymer tanning agents and mineral tanning agents, fatliquoring agents and dyes can also be added. By adding acid, the component $B_4$ can be selectively dimerized or oligomerized.

It is also particularly preferable to use the component $B_4$ as a self-inhibiting emulsifier mixed with component a) and/or mixed with the components $B_1$ to $B_3$ or mixtures thereof.

It is very particularly preferable to use component $B_4$ in combination with component a). Preferably, these mixtures have the following composition:

| | |
|---|---|
| 1 to 20% by weight | of component $B_4$ (based on solids content) |
| 0.01 to 40% by weight | of component a) (based on active ingredient/solids content) |
| 40 to 99.89% by weight | of water (total = 100%) |

The preparation of such mixtures is carried out, for example, by dissolving a dispersion or solution of the component $B_4$ in an emulsion of the component a) at 10 to 60° C. It is also possible to dissolve or to disperse the active ingredient of component $B_4$ in the polysiloxane and to disperse the resulting mixture together in water, as has already been described for the preparation of the polysiloxane emulsion (component a).

Water-repellent systems containing (based on the system)

1) 1 to 60% by weight of a dispersion consisting of (calculated in each case as solids content)

| | | |
|---|---|---|
| 1.1) | 1 to 50% of component $B_1$ | |
| 1.2) | 0 to 50% of component $B_3$ | (relative to 1) |
| 1.3) | 0 to 99% of water | | and 2) 0.1 to 40% of a polysiloxane emulsion comprising (calculated in each case as solids content)

| | | |
|---|---|---|
| 2.1) | 0.01 to 40% polysiloxane a) | |
| 2.2) | 40 to 99.89% of water | (relative to 2) |
| 2.3) | 0.1 to 20% of component $B_4$ | | and water to make up to 100% are preferred.

Water-repellent systems containing
1) 1 to 60% of a dispersion consisting of
   1.1) 3 to 30% of component $B_1$ (calculated in each case as solids content)
   1.2) 10 to 40% of component $B_3$ (calculated in each case as solids content)
   1.3) 30 to 87% of water
and
2) 0.1 to 40% of a polysiloxane emulsion comprising

| | | |
|---|---|---|
| 2.1) | 10 to 40% of polysiloxane a) | |
| 2.2) | 0.1 to 10% of component $B_4$ | (calculated in each case as solids content) |
| 2.3) | 50 to 89.9% of water | | and water to make up to 100% are particularly preferred.

It has furthermore been found that the leathers which are produced by use of the components $B_1$ and $B_3$, and $B_2$ and $B_3$, and a subsequent top water-repellent treatment with polysiloxanes a), optionally with addition of the component $B_4$, give a particularly good result and best fulfil the spectrum of the objects set in its totality.

The invention also relates to a process for imparting water repellency to substrates, preferably those having a flexible, in particular fibrous structure, which is characterized in that the substrate is treated with the polysiloxane according to the invention and/or with the water-repellent system according to the invention, in particular with the water-repellent system according to the invention.

Suitable substrates may be: cellulose-containing materials, such as paper, board, cardboard, nonwovens, textile structures such as wool or cotton articles, leather, hides and leather substitution products, preferably leather and hides.

The retanning of the substrates with softening and/or imparting of water repellency to the substrates is preferably carried out by treating the substrates with an aqueous liquor which contains the polysiloxane according to the invention and/or the water-repellent system according to the invention. For this purpose, the substrate is brought into contact with the liquor by application by means of rollers or in a container, in the case of leather preferably in a tanning drum. After the treatment, the substrate is dried.

The retanning of leather, hides and leather fibre material with softening and/or imparting of water repellency to leather, hides and leather fibre material consists of several individual steps, wet blue, i.e. chrome-tanned skins and hides, preferably being used as starting material. The process steps are to be explained in detail for wet blue:

1. Neutralization of the chrome-tanned leather
2. Retanning and optionally dyeing
3. Addition of the polysiloxane according to the invention, in particular in the form of the water-repellent system (metering of the components a) and b) either together or preferably in succession).

In a preferred embodiment, one or more components from the group $B_1$, $B_2$, $B_3$ or $B_4$ are metered independently of one another in process step 3 and, after an action time of 0.1 to 5 hours, the component a), optionally in combination with component $B_4$, is added. After a further 0.1 to 5 hours, the procedure is continued with process step 4.

After step 3, fixing is optionally effected with metal salts or with Cr(III) salts, but compulsorily and preferably fixation with formic acid or with an inorganic acid is carried out. This is preferably effected by the process steps 4 to 6.

4. Reduction of the pH by addition of a carboxylic acid, preferably formic acid, to pH<4.5, preferably to 3.0 to 4.5
5. Washing
6. Customary finishing (setting-out or samming, drying by hanging, staking, application of a vacuum (1 minute, 70° C.)).

In an embodiment which is likewise preferred, component $B_1$ or $B_2$ or a mixture of components $B_1$ and $B_3$ or a mixture of components $B_2$ and $B_3$ is metered after process step 2 and, after an action time of 0.1 to 5 hours, the component a) or a mixture of components a) and $B_4$ is added. After a further action time of 0.1 to 5 hours, the procedure is continued with process step 4.

Advantages of the process according to the invention are:
1. No chromium salts or other mineral salts are required for fixing.
2. Additional fatliquoring agents can be used for establishing a soft handle but are not necessary.
3. The application can also be carried out in a so-called compact procedure:

Here, preferably the components $B_1+B_2$ or $B_1+B_3$ or $B_2+B_3$ or $B_1+B_2+B_3$ of b) of the water-repellent system are added, for example as a mixture, after the neutralization of the leather and, after a specific run time, preferably after 1 to 5 hours at 20–60° C., the component a) and optionally the component $B_4$ as a mixture with a) are added without discharging the liquor or a wash process. After a run time of a) or ($B_4$+a) of about 1 to 2 hours at 20–60° C., the formic acid is added to the same liquor and the products a) and b) are fixed. As a result of this procedure and the good liquor exhaustion, hardly any wastewaters are obtained.

4. For fixing the polysiloxane/dispersions according to the invention, it is sufficient to reduce the pH by adding a carboxylic acid having a pKa value of less than 5 after a sufficient run time with the water-repellent system. The liquor exhaustion is as a rule so good that addition of the acid in the drum is possible even without discharging the liquor for imparting water repellency. Preferred pH values should be less than 4.5, in order to achieve sufficient fixing in the hide substance. The range between 3.0 and 4.5 is particularly preferred. A preferred carboxylic acid is formic acid. It is also possible to use an inorganic acid, in which case it should be ensured that the pH is adjusted to between 3.0 and 4.5. The run time with the acid is as a rule 0.1 to 5 hours.

Instead of fixing with a carboxylic acid or in combination with an acid fixing, it is also possible to add polyvalent metal compounds, such as aluminium, titanium, zirconium or chromium salts or carboxylates or alkoxides, to the liquor. For ecological reasons, however, this is generally dispensed with. At least fixing with a mineral salt has no advantage over fixing with acid.

To achieve a sufficient water-repellent effect, the following amounts (data in solids content, based on shaved weight of leather or wet weight of the hides) are preferably used in the process according to the invention:

- 0 to 30% by weight of component $B_1$, preferably 0.1 to 15% by weight of $B_1$,
- 0 to 30% by weight of component $B_2$, preferably 0.1 to 15% by weight of $B_2$,
- 0 to 50% by weight of component $B_3$, preferably 0.1 to 20% by weight of $B_3$,
- 0 to 20% by weight of component $B_4$, preferably 0.1 to 5% by weight of $B_4$,
- 0.1 to 25% by weight of component a), preferably 0.1 to 6% by weight of a), the amounts being used independently of one another and the amounts of the components $B_1$ to $B_4$ used preferably not simultaneously being 0% by weight.

The pH of the liquor is preferably 5.5 to 7 at the beginning of the procedure for imparting water repellency. The pH can optionally be corrected before the addition of the water-repellent system by adding bases such as ammonia or sodium bicarbonate. To achieve a sufficient water-repellent effect, in particular up to 10% by weight, preferably up to 8% by weight, of active substance of the polysiloxane a) according to the invention, based on shaved weight or skin weight, are used according to the process according to the invention. The treatment is effected at a temperature between 20 and 60° C., preferably between 35 and 50° C. After the treatment, the liquor has a pH of about 5 to 6. By adding a carboxylic acid, the pH is reduced to 3 to 4.5. A preferred carboxylic acid for the acidification is formic acid. The acidification preferably takes place for up to half an hour at 20–60° C. Thereafter, the leather is thoroughly washed with water and is finished in the customary manner.

In a particularly preferred embodiment, the process for the production of water-repellent leathers is carried out as follows (the stated amounts are relative to active substance or solids content, based on shaved weight of the leather or wet weight of the hides):

1. Neutralization
   Wet blue is first neutralized with a liquor containing 1% of sodium bicarbonate and 1% of sodium formate, at 20–60° C. (run time 2 to 24 hours) so that a pH between 5.0 and 5.5 results. Liquor length 100 to 400%. The leather is then rinsed.
2. Retanning/Dyeing
   A fresh liquor containing a retanning agent, e.g. a vegetable tanning agent, such as chestnut bark extract (sweetened chestnut) and a synthetic tanning agent (such as TANIGAN QF), and a dye (for example BAYGENAL Brown CGG) is added. The drum is allowed to run for from 1 to 5 hours at 20–60° C., preferably at 30–45° C. Finally, the liquor is discharged and washing is effected.
3. Imparting Water Repellency
   A liquor which contains 0.1–0.5% of ammonia of 0.3–0.5% of $NaHCO_3$ is introduced into the tanning drum and further neutralization is effected for 10–60 minutes, after which the liquor is discharged. 2–8% by weight of the component $B_1$) and/or $B_2$), or 2 to 8% by weight of a prepared formulation comprising $B_1$) and/or component $B_2$) containing component $B_3$), and 100% of water are then added (liquor length 50–200%). After a drumming time of 1–3 hours at 20–60° C. and complete exhaustion of the liquor, 0.5–2.5% of the component a) or of a mixture a)+$B_4$ are added without further addition of water and drumming is carried out for a further 30–120 minutes at 20–60° C.
4. Fixing
   0.3–2% of formic acid (85% strength, 1:10) are then added without liquor change, and the leather is acidified to pH 3.0–4.5, preferably to pH 3.5–4.0. The liquor is then discharged.
5. Finishing
   First washing with warm water (30–50° C.), setting-out or samming is effected and the leather is finished in a customary manner (hanging to dry, staking, application of a vacuum for 1 minute at 50–70° C.).

The process according to the invention gives leather having outstanding hydrophobic properties and a soft and full handle.

PREPARATION EXAMPLES

Polyacrylate Dispersion 1 (PAC 1)

Preparation of the Polyacrylate (Component $B_1$)

2500 g of xylene are initially introduced into a 50 l stirred container and heated to 140–145° C. A solution of 18750 g of C17.4-methacrylate (from Röhm) or stearyl methacrylate, 6250 g of acrylic acid and 1250 g of mercaptoethanol in 3750 g of xylene and a solution of 750 g of di-tert-butyl peroxide in 2500 g of xylene are added dropwise to the initially introduced substance separately and simultaneously in the course of 2 hours with stirring. Stirring is then continued for 2 hours at 140–145° C. The polymer solution is drawn by means of a vacuum via a heated line into a 200 l reactor which is filled with 125 l of water at a temperature of 80–90° C. The xylene is distilled off azeotropically, the polymer being precipitated. The polymer solution is added to the precipitation reactor at a rate such that the amount of xylene distilling off approximately corresponds to the feed. After the end of the distillation, distillation is carried out with a full vacuum for a further 1 hour. After the complete removal of the xylene, a heterogeneous, readily stirrable mixture has formed, which consists of the precipitated polymer and xxwater. To prepare the dispersion, a solution of 6900 g of 50% strength NaOH solution and 12500 g of water is pumped in while stirring. Stirring is continued for one hour at 80–90° C. To remove the xylene residues, degassing is effected in v acuo at 50–60° C. A solvent-free, white dispersion having the following properties is obtained:

Solids content: 33% by weight pH: 13.5

Mean particle size: 250 nm

Viscosity: about 2000 mPas (20° C., 100 s$^{-1}$)

Polyacrylate Dispersion 2 (PAC 2)

Formulation with C14–C17-liquid Paraffin (Components $B_1$ and $B_3$)

The polyacrylate dispersion 1 described above (component $B_1$) is adjusted to a solids content of 30% by weight with water. 1000 g of this 30% strength emulsion are dispersed with 500 g of $C_{14}$–$C_{17}$-liquid paraffin (component $B_3$) in a dissolver for 10 minutes. Dispersing is then continued, optionally with a jet disperser (dispersing nozzle) or an ultrasonic homogenizer, in order to adjust the particle size to the intended use. The stable polyacrylate dispersion 2 is obtained. Solids content: 53.0% by weight Polyacrylate Dispersion 3 (PAC 3)
Formnulation with White Oil 285 (Components $B_1$ and $B_3$)

The polyacrylate dispersion 1 described above (component $B_1$) is adjusted to a solids content of 30% with water. 1000 g of this 30% strength emulsion are then dispersed with 500 g of white oil 285 (component $B_3$) in a dissolver for 10 minutes. Dispersing is then continued, optionally with a jet disperser (dispersing nozzle) or an ultrasonic homogenizer, in order to adjust the particle size to the intended use.

Solids content: 53.0% by weight
Mean particle size: 300 nm–1000 nm (adjustable)

Polyacrylate Dispersion 4 (PAC 4)
Formulation of LEUKOTAN NS 3 and white oil 285 (components $B_1$ and $B_3$)

Leukotan® NS 3 (ROHM and HAAS) is a pasty polyacrylate dispersion (solids content 34.0 to 38.0% by weight, pH 7.0 to 8.0. density 1.04 g/cm³).

240 g of water are initially introduced into a stirred container. 460 g of the polyacrylate dispersion LEUKOTAN® NS 3 (Rohm and Haas) (=component $B_1$) are then introduced at 20–25° C. while stirring. The batch is stirred for 30 minutes at this temperature until the Leukotan® NS 3 has been homogeneously distributed. 300 g of white oil 285 (component $B_3$) are then metered in at 20–25° C. while stirring in the course of 10 minutes. The mixture is stirred for a further 60 minutes at 20–25° C. and then dispersed with the aid of a dissolver for 10 minutes at 20–30° C. Thereafter, cooling to $\leq 30°$ C. and filtration, optionally Edith the use of a 100 μm filter, are effected. A white dispersion having a long shelf life and the following properties is obtained:

Solids content: 46.6% by weight
pH: 6.4 (undiluted, potentiometric)
Viscosity: 2100 mPas (20° C., D=100 sec$^{-1}$)

Polyacrylate Dispersion 5 (PAC 5)
Formulation of LEUKOTAN® NS 3 and White Oil 285 (20:80) (Components $B_1$ and $B_3$)

376 g of water are initially introduced into a stirred container. 256 g of the polyacrylate dispersion LEUKOTAN® NS 3 (Rohm and Haas) (=component $B_1$) are then introduced at 20–25° C. while stirring. The batch is stirred for 30 minutes at this temperature until the Leukotan® NS 3 has been homogeneously distributed. 368 g of white oil 285 (component $B_3$) are then metered in at 20–25° C. while stirring in the course of 10 minutes. The mixture is stirred for a further 60 minutes at 20–25° C. and then dispersed with the aid of a dissolver for 10 minutes at 20–30° C. Thereafter, cooling to $\leq 30°$ C. and filtration, optionally with the use of a 100 μm filter, are effected. A white dispersion having a long shelf life and the following properties is obtained:

Solids content: 46.6% by weight
pH: 6.4 (undiluted, potentiometric)
Viscosity: 510 mPas (20C. D=100 sec$^{-1}$)

Polyacrylate Dispersion 6 (PAC 6)
Formulation of LEUKOTAN® NS 3 and White Oil 285 (Components $B_1$ and $B_3$)

585 g of a polyacrylate dispersion LEUKOTAN® NS 3 (Rohm and Haas) (=component $B_1$) heated to 40° C. are initially introduced into a stirred container (dissolver). Thereafter, 715 g of white oil 285 (component $B_3$) are added and mixing is carried out for 1–2 minutes by means of the dissolver. Cooling to 30° C. is effected. With the dissolver stationary, 715 g of water are metered in. Dispersing is then effected for 15–20 minutes at maximum speed with cooling (about 30° C.). Filtration is effected with the use of a 100 μm filter. A white dispersion having a long shelf life, medium viscosity and the following properties is obtained:

Solids content: 46.0% by weight
pH: 6.5 (undiluted, potentiometric)

Dispersion of a Polyaspartamide (Component $B_2$) (PAS 1)

16.61 kg of maleic anhydride in 13.22 kg of diethylene glycol are initially introduced into a reaction vessel while stirring. Thereafter, cooling to 10–20° C. is effected and 13.84 kg of aqueous ammonia solution (25%) are metered in, while cooling, so that the temperature is kept below 60° C. After the end of the addition, stirring is continued for 1 hour at 70 ° C. Thereafter, heating to 140–145° C. is effected in the course of 2.5 hours and water is distilled off. Distillation is then continued at 700–900 mbar to complete the condensation reaction. 13.44 kg of distillate are removed. After the end of the distillation, 11.43 kg of an industrial mixture of hexadecylamine and octadecylamine (hydrogenated tallow fatty amine) are metered in at 140–145° C. The batch is stirred for a further 6 hours at 140–145° C. Thereafter, the batch is cooled and 2.85 kg of oleic acid are metered in, beginning at 110° C. After 10 minutes, 0.14 kg of a silicone-containing antifoam (e.g. RESPUMIT® S, Bayer AG) is added and stirring is carried out for 10 minutes. A solution of 1.23 kg of monoethanolamine in 47.19 kg of water is stirred in in the course of 5 to 30 minutes, the temperature being kept between 80° C. and 95° C. After the end of the addition, the batch is stirred for 15 minutes. Thereafter, cooling to 60–70° C. is effected, 2.92 kg of 50% sodium hydroxide solution are drawn in in the course of 60 minutes and stirring is continued for 1 hour at 60–70° C. 4.01 kg of hydrogen peroxide solution (35%) are then pumped in in 30 minutes. Stirring is continued for about 3 hours at 60–70° C. Cooling to $\leq 35°$ C. is then effected while stirring. Any traces of hydrogen peroxide present are removed by means of a reducing agent, e.g. BAYREDUKT® EPK (Bayer AG) and the product is filtered over a 30 μm filter.

Solids content: 34% by weight
pH: 6.5–7.5 (1 part sample—4 parts of water)
Viscosity: 100–500 mPas at 20° C. (D=100 sec$^{-1}$)
Particle size: $d_{50}$=100–300 nm Isocyanate Polyadduct 1 (PU 1) (Component $B_4$)

20 g of cyanamide are dissolved in 50 g of tetrahydrofuran. 48.2 g of triethylamine are added below 25° C., with cooling. Directly; thereafter, 95.25 g of a polyisocyanate obtained by trimerization of hexamethylene diisocyanate and having isocyanurate groups and characterized by an average NCO functionality of about 3.3 (NCO content= 22.5% by weight) and a viscosity of 800 mnPas at 20° C. (DESMODUR® N3600, BAYER AG) are added dropwise. 125 g of water are then stirred in. The solvent is then distilled off from the reaction mixture at 80° C. while stirring. The solids content of the clear, aqueous solution is about 64% by weight. The solids content is adjusted to 57% by weight by adding water.

Isocyanate Polyadduct 2 (PU 2) (Component $B_4$)

In a 1 l three-necked flask, 186.4 g (1 mol) of lauryl alcohol and 222 g (1 mol) of isophorone diisocyanate are stirred for 6 hours at 60° C. The reaction mixture has an isocyanate content of 10.28%. 42 g (1 mol) of cyanamide are introduced into the reaction mixture and stirred for 30 minutes. At 60° C., 101.2 g (1 mol) of triethylamine are added in portions. After a subsequent stirring time of 1 hour, the mixture is poured into a shallow mould. A material which solidifies to a glassy form at room temperature and is readily water-soluble is obtained.

Isocyanate Polyadduct 3 (PU 3) (Component $B_4$)

In a 1 l three-necked flask, 380.6 g (2.04 mol) of lauryl alcohol and 932.4 g (4.20 mol) of isophorone diisocyanate are stirred for 4 hours at 70° C. The mixture has an isocyanate content of 20%. A solution of 252 g (6 mol) of cyanamide and 607 g (6 mol) of triethylamine in 3250 g of water is slowly poured into the reaction mixture. An aqueous solution having a solids content of 40% is obtained.

Isocyanate Polyadduct 4 (PU 4) (Component $B_4$)

Repetition of Example PU3 with the following modifications: 1 mol of oleyl alcohol, 1 mol of 3,5-bis-(isocyanatohexyl)-2,4,6-trioxo-tetrahydro-1,3,5-oxadiazine, 1.35 mol of triethylamine and 1.5 mol of cyanamide. A 30.6% strength aqueous dispersion is obtained.

Isocyanate Polyadduct 5 (PU 5) (Component $B_4$)

587 g of cyanamide (10% strength in water) are initially introduced at 20° C. 147.2 g of triethylamine are added in 30 minutes at 20–25° C. with cooling. Directly thereafter, 800 g of acetone are added. 265.8 g of a polnisocyanate obtained by trimerization of hexamethylene diisocyanate and having biuret groups and characterized by an average NCO functionality of about 3.5 (NCO content=23% by weight) and a viscosity of 2500 mPas at 20° C. (DESMODUR® N 3200, Bayer AG), dissolved in 200 g of acetone, are then added dropwise at 20–30° C. in the course of 60 minutes. Stirring is then carried out for a further 30 minutes. The solvent is distilled off from the reaction mixture at 40° C. and 150–600 mbar. A clear, aqueous solution having a solids content of about 47% by weight is obtained (pH 7.7, viscosity 60 mPas).

Isocyanate Polyadduct 6 (PU 6) (Component $B_4$)

2240 g of a difunctional hexanediol polycarbonate diol (OH number=56) and 82 g of a difunctional propylene oxide polyether (OH number=56) are dehydrated at 120° C./15 hPa. 363 g of 3,5-bis-(6-isocyanatohexyl)-2,4,6-trioxotetrahydro-1,3,5-oxadiazine (technical-grade product, MW=422.0), 67.2 g of hexamethylene diisocyanate and 184.3 g of isophorone diisocyanate are added at 80° C. After 3 hours at 90° C. the prepolymer is diluted with 6000 g of acetone. 18.0 g of ethylenediamine and 12.5 g of hydrazine hydrate in 300 g of water are added to this solution and stirring is continued for 15 minutes at 50° C. Then a solution of 33.6 g of cyanamide in 400 g of water is added. A further 20 minutes later 80.7 g of triethylamine are added. After 45 minutes the evolution of $CO_2$ has ended. The mixture is diluted with 6000 g of water and then the acetone is distilled off under reduced pressure. A finely divided dispersion is obtained having an average particle size of the dispersed phase of approx. 95 nm, a solids content of 32.5% and an outflow viscosity of 12 seconds.

The composition of suitable cyanamide pol,adducts is, as the following example shows, not limited to the composition of PU 6 already mentioned. A cyanamide polyadduct in which the starting products and quantities have been varied analogously to PU 6 is also suitable:

32.5 g of 3,5-bis-(6-isocyanatohexyl)-2,4,6-trioxotetrahydro-1,3,5-oxadiazine (technical grade product, MW=422.0), 11.3 g of hexamethylene diisocyanate and 29.7 g of isophorone diisocyanate are added at 60° C. to a dehydrated polyol mixture of 157.1 g of a difunctional hexanediol polycarbonate diol (OH number=56), 0.86 g of 2-ethylhexanol and 51.9 g of a difunctional propylene oxide polyether started on bisphenol A. After 3 hours at 90–95° C. the prepolymer is diluted with 663 g of acetone. When an NCO content of 1.1% has been reached a solution of 1.43 g of hydrazine hydrate and 5.69 g of isophorone diamine in 42.1 g of water is added at 50–55° C. and the mixture is subsequently stirred for 15 minutes at 50° C. Then 36.6 g of a 10% aqueous solution of cyanamide are added. A further 10 minutes later 8.7 g of triethylamine are added. After 1 hour the evolution of $CO_2$ has ended. The mixture is diluted with 632 g of water and then the acetone is distilled off under reduced pressure. A finely divided dispersion is obtained having an average particle size of the dispersed phase of approx. 70 nm, a solids content of 30% and a viscosity of approx. 10 mPas at 20° C./10 $s^{-1}$.

Silicone Emulsion 1 (Component a)) (SIL 1)

332.8 g of trimethylsilyl-terminated polydimethylsiloxane (viscosity 5000 $mm^2/s$, 25° C.) (e.g. BAYSILONE® Oil M 5000, Bayer AG) are initially introduced into a stirred container. Thereafter, while stirring at room temperature, 14.9 g of 2-aminoethyl-3-aminopropyl-methyl-dimethoxysilane (Dynasilan 1411, from Hüls) and then 0.2 g of sodium hydroxide solution (50% strength) are added. The vessel content is heated in the course of 2 hours at 115° C. Stirring is effected for 5.25 hours at 115° C., a gentle stream of $N_2$ being passed over. Stirring is then effected for a further 0.75 hour in vacuo at 100–150 hPa. During this condensation (6 hours), 1.1 g of distillate are removed. After the end of the methanol elimination, the batch is cooled to 20–30° C. while stirring. A polysiloxane functionalized with 2-aminoethyl-3-aminopropyl side chains is obtained (base N content=0.56% by weight, viscosity at 20° C./100 $s^{-1}$=95 mPas).

14.7 g of maleic anhydride are added at 20–30° C. while stirring. The suspension obtained is heated to 65° C. and stirred for 1 hour at 65° C. A clear solution forms. The IR spectrum of a sample shows no anhydride band at 1850 $cm^{-1}$. The viscosity of the intermediate is about 40000 mPas at 100 $s^{-1}$ and 20° C. 15.3 g of triethylamine are then metered in at 50–55° C. The batch is stirred for a further 20 minutes at 50–55° C. (viscosity at 20° C., D=10 $s^{-1}$: 65000 mPas). 115.6 g of isopropanol are then stirred in at 50–55° C. Stirring is continued for 30 minutes at 50–55° C. The batch has a low viscosity.

635.9 g of water (room temperature) are added to the silicone active ingredient described above by means of a pump at 50–55° C. with high-speed stirring and 50–55° C. are maintained. The metering is carried out linearly and continuously in the course of 3.5 hours. The batch remains readily stirrable throughout the entire metering phase. The metering rate is adjusted so that the water added is always well distributed. After about 50% of the total amount of water, the viscosity maximum is reached. On further addition of water, the emulsion rapidly acquires a low viscosity again. After the end of the addition, the batch is stirred for a further 15 minutes.

128.3 g of isopropanol/water mixture are then distilled off at 50–55° C. and 180–250 hPa. A white, finely divided emulsion is obtained. Foam formation does not occur under the given distillation conditions. Finally, cooling to room temperature ($\leq 30°$ C.) is effected and filtration is effected over a 20 μm sieve.

Solids content: 37.8% pH: about 7 (undiluted)

Mean particle size: 112 nm

Miscibility with water: without specks

Viscosity: <100 mPas, 30 mPas at 100 $sec^{-1}$, 20° C.

Shelf-life: very good

Silicone Emulsion 2 (Component a)) (SIL 2)

1923.6 g of BAYSILONE® Oil M 5000 (viscosity 5000 $mm^2/s$, 25° C.) are equilibrated with 86.2 g of Wacker silane GF 95 in the presence of 1.96 g of 30% NaOH. After condensation for 6 hours at 115° C. and removal of 3.1 g of distillate, a polysiloxane containing 2-aminoethyl-2-aminopropyl groups is obtained (base N content of 0.6%, viscosity at 20° C.=103 mPas).

300 g of this polysiloxane are dissolved in 300 g of tetrahydrofuran and mixed with 12.6 g of maleic anhydride in 120 parts of tetrahydrofuran. The mixture is heated to 65° C. and stirred for 0.5 hour at 65° C. At 55° C., 18.0 g of triethyl-amine are added and stirring is carried out for a further 30 minutes. At 55° C., 750 g of water are metered in in the course of 3 hours. After the end of the addition, the solvent/water mixture is distilled off. A stable silicone emulsion is obtained.

Solids content: 34% by weight
Viscosity (20° C./100 s$^{-1}$): about 20 mPas
Mean particle size: 220 nn Silicone Emulsion 3 (Component B$_4$+a)) (SIL 3)

5.3 g of the cyanamide-polyisocyanate reaction product 1 (PU1) (component B$_4$) and 100 g of the silicone emulsion 2 (SIL2) are stirred at room temperature for 30 minutes.

The stable silicone emulsion 3 is obtained.

Solids content: 35% by weight
Mean particle size: 253 nm
Viscosity: 25 mPas (20° C.)

Silicone Emulsion 4 (Component a)) (SIL 4)

1400 g of trimethylsilyl-terminated polydimethylsiloxane (viscosity 1000 mm$^2$/s, 25° C.) (commercial product: BAYSILONE® Oil M 1000) are initially introduced. Thereafter, 49.5 g of 2-aminoethyl-3-aminopropyl-methyl-dimethoxysilane (Dynasilan® 1411, from Hüls) and then 0.86 g of sodium hydroxide solution (50% strength) are added. The vessel content is heated to 115° C. in the course of 2 hours. Stirring is carried out for 5.25 hours at 115° C., a gentle stream of N$_2$ being passed over. Stirring is then carried out for a further 0.75 hour in vacuo at 65 hPa. During the condensation (6 hours), 1.5 g of distillate are removed. After the end of the methanol elimination, the batch is cooled to 25° C. while stirring. A polysiloxane functionalized with 2-aminoethyl-3-aminopropyl side chains (base N content=0.44% by weight, viscosity at 20° C./100 s$^{-1}$=94 mPas) is obtained.

300 g of the aminopolysiloxane prepared in this manner and having a base N content of 0.44% by weight are initially introduced at 25° C., and 10.3 g of maleic anhydride are stirred in. The suspension obtained is heated to 65° C. and stirred for 1 hour at 65° C. A clear solution forms. The IR spectrum shows no anhydride band at 1850 cm$^{-1}$. The viscosity of the intermediate is about 30000 mPas at 100s$^{-1}$ and 20° C. The batch is then cooled to 50–55° C. 10.6 2 of triethylamine are metered in with thorough stirring at 55° C. The batch is stirred for a further 20 minutes at 55° C., the viscosity gradually increasing (viscosity at 20° C., D=10 s$^{-1}$: about 50000 mPas). 100 g of isopropanol are then added and stirring is carried out for a further 30 minutes at 55C. At 50–55° C., 550 g of water are pumped in with rapid stirring in the course of 3 hours. The dispersion obtained is freed from the solvent at 55° C. and 140–250 hPa. 117.5 g of isopropanol/water mixture are distilled off. A white, finely divided emulsion is obtained. Under these conditions, no foam is observed during the distillation. Thereafter, cooling to room temperature ($\leq$30° C.) is effected and filtration is carried out over a 20 μm sieve.

Solids content: 36.9%
pH: about 7 (undiluted)
Mean particle size: 174 nm
Miscibility with water: in any ratio
Viscosity: 36 mPas (at 100 sec$^{-1}$, 20° C.)
Shelf-life: very good Silicone Emulsion 5 (Component a)) (SIL 5)

332.8 g of trimethylsilyl-terminated polydimethylsiloxane (viscosity 5000 mm$^2$/s, 25° C.) (commercial product: BAYSILONE® Oil M 5000) are initially introduced. Thereafter, 14.9 g of 2-aminoethyl-3-aminopropyl-methyl-dimethoxysilane (Dynasilan® 1411, from Hiils) and hen 0.2 g of sodium hydroxide solution (50% strength) are added. The vessel content is heated to 115° C. in the course of 2 hours. Stirring is carried out for 6 hours at 115° C., a gentle stream of N$_2$ being passed over. Stirring is then carried out for a further 1 hour in vacuo at 65 hPa. During the condensation (6 hours), 1.2 g of distillate are removed. A polysiloxane functionalized with 2-aminoethyl-3-aminopropyl side chains (base N content=0.56% by weight, viscosity at 20° C./100 s$^{-1}$=100 mpas) is obtained.

150 g of the aminopolysiloxane prepared in this manner and having a base N content of 0.56% by weight (60 mmol of N) are initially introduced at 25° C. and 50 g of acetone, 0.68 g of caprolactone (6 mmol) and 5.3 g of maleic anhydride (54 mmol) are added. The mixture is heated to 60° C. and stirred for 2 hours at 60° C. The batch is cooled to 25° C. 5.46 g of triethylamine (54 mmnol) are metered in while stirring. Stirring is carried out for a further 30 minutes at 25° C. 19 g of cyclohexanol are then added. At 25° C., 300 g of water are pumped in wvith rapid stirring in the course of 3 hours. The dispersion obtained is freed from the solvent at 50° C. and 900–800 hPa. A white, finely divided emulsion is ootained (no foam during the distillation, filtration over 100 μm sieve).

Solids content: 33.6% by weight
pH: about 7 (undiluted)
Mean particle size 177 nm
Miscibility with water: in any ratio
Viscosity: 27 mPas (at 100 sec$^{-1}$, 20° C.)
Shelf-life: very good Silicone Emulsion 6 (Component a)) (SIL 6)

700.0 g of trimethylsilyl-terrninated polydinmethylsiloxane (viscosity 1000 mm$^2$/s, 25° C.) (commercial product: BAYSILONE® Oil M 1000) are initially introduced. Thereafter, 24.8 g of 2-aminoethyl-3-aminopropyl-methyl-dimethoxysilane (Dynasilan® 1411, from Hüls) and then 0.43 g of sodium hydroxide solution (50% strength) are added. The vessel content is heated to 115° C. in the course of 2 hours. Stirring is carried out for 6 hours at 115° C., a gentle stream of N$_2$ being passed over. Stirring is then carried out for a further 1 hour in vacuo at 65 hPa. During the condensation (6 hours), 1.5 g of distillate are removed. A polysiloxane functionalized with 2-aminoethyl-3-aminopropyl side chains (base N content=0.45% by weight, viscosity at 20° C./100 s$^{-1}$=94 mPas) is obtained.

500 g of the aminopolysiloxane prepared in this manner and having a base N content of 0.45% by weight (160 mmol of N) are initially introduced at 25° C. and 0.91 g of caprolactone (8 mmol), 100 ppm of dibutyltin dilaurate and 14.9 g of maleic anhydride (152 mmol) are added. The mixture is heated to 60° C. and stirred for 2 hours at 60° C. At 65° C., 16.7 g of triethylamine (160 mmol) are metered in while stirring and stirring is carried out for a further 30 minutes. 167 g of isopropanol are then added. At 55° C., 916.6 g of water are pumped in with rapid stirring in the course of 3 hours. The dispersion obtained is freed from the solvent at 40–60° C. and 185–450 hPa (199.4 g of distillate, no foam during the distillation, filtration ofthe product over 20 μm sieve). A white, finely divided emulsion is obtained.

Solids content: 36.7% by weight
pH: about 7 (undiluted)
Mean particle size: 134 nm
Miscibility with water: in any ratio
Viscosity: 19 mPas (at 100 sec$^{-1}$, 20° C.)
Shelf-life: very good Silicone Emulsion 7 (Component a)) (SIL 7)

700.0 g of trimethylsilyl-terminated polydimethylsiloxane (viscosity 1000 mm$^2$/s, 25° C.) (commercial product: BAYSILONE® Oil M 1000) are initially introduced. Thereafter, 24.8 g of 2-aminoethyl-3-aminopropyl-methyl-dimethoxysilane (Dynasilan® 1411, from Hüls) and then 0.43 g of sodium hydroxide solution (50% strength) are added. The vessel content is heated to 115° C. in the course of 2 hours. Stirring is carried out for 6 hours at 115° C., a gentle stream of N$_2$ being passed over. Stirring is then carried out for a further 1 hour in vacuo at 65 hpa. During the condensation (6 hours), 1.5 g of distillate are removed. A polysiloxane functionalized with 2-aminoethyl-3-aminopropyl side chains (base N content=0.45% by weight, viscosity at 20° C./100 s$^{-1}$=128 mPas) is obtained.

500 g of the aminopolysiloxane prepared in this manner and having a base N content of 0.45% by weight (160 mmol of N) are initially introduced at 25° C. and 18.4 g of caprolactone (160 mmol), 100 ppm of tin octanoate and 100 g of acetone are added. The mixture is stirred for 12 hours at 62° C. (the carbonyl band of the lactone (at 1722 cm$^{-1}$) is no longer present in the IR spectrum). Thereafter, 15.7 g of maleic anhydride (160 mmol) are added and stirring is carried out for 2 hours at 65° C. (anhydride no longer detectable). Thereafter, 16.7 g of triethylamine (160 mmol) are metered in while stirring and stirring is carried out for a further 30 minutes. 100 g of isopropanol are then added. At 55° C., 916.6 g of water are pumped in with rapid stirring in the course of 2.5 hours. The dispersion obtained is freed from the solvent at 50° C. and 140–250 hPa (212 g of distillate, no foam during the distillation, filtration of the product over a 20 µm sieve). A white, finely divided emulsion is obtained.

Solids content: 37.5% by weight
pH: about 7 (undiluted)
Mean particle size: 412 nm
Miscibility with water: in any ratio
Viscosity: 13 mPas (at 100 sec$^{-1}$, 20° C.)
Shelf-life: very good Silicone Emulsion 8 (Component a)+B$_4$)) (SIL 8)

700.0 g of trimethylsilyl-terminated polydimethylsiloxane (viscosity 5000 m 25° C.) (commercial product: BAYSILONE® Oil M 5000) are initially introduced. Thereafter, 24.8 g of 2-aminoethyl-3-aminopropyl-methyl-dimethoxysilane (Dynasilan® 1411, from Hüls) and then 0.43 g of sodium hydroxide solution (50% strength) are added. The vessel content is heated to 115° C. in the course of 2 hours. Stirring is carried out for 6 hours at 115° C., a gentle stream of N$_2$ being passed over. Stirring is then carried out for a further 1 hour in vacuo at 65 hPa. During the condensation (6 hours), 1.7 g of distillate are removed. A polysiloxane functionalized with 2-aminoethyl-3-aminopropyl side chains (base N content=0.45% by weight, viscosity at 20° C./100 s$^{-1}$=150 mPas) is obtained.

500 g of the aminopolysiloxane prepared in this manner and having a base N content of 0.45% by weight (160 mmol of N) are initially introduced at 25° C. and 18.4 g of caprolactone (160 mmol), 100 ppm of tin octanoate and 100 g of acetone are added. The mixture is stirred for 10 hours at 62° C. (the carbonyl band of the lactone (at 1722 cm$^{-1}$) is no longer present in the IR spectrum). Thereafter, 15.7 g of maleic anhydride (160 mmol) are added and stirring is carried out for 2 hours at 65° C. (anhydride no longer detectable). Thereafter, 16.7 g of triethylamine (160 mmol) are metered in while stirring and stirring is carried out for a further 30 minutes. 167 g of isopropanol are then added. At 55° C., 916.6 g of water are pumped in with rapid stirring in the course of 2.5 hours. 50 g of a cyanamide-polyisocyanate reaction product 1 (PU 1) are added. The dispersion obtained is freed from the solvent at 50° C. and 140–250 hPa (295 g of distillate, no foam during the distillation, filtration of the product over a 20 µm sieve). A white, finely divided emulsion is obtained.

Solids content: 38.8% by weight
pH: about 7 (undiluted)
Mean particle size: 118 nm
Miscibility with water: in any ratio
Viscosity: 30 mPas (at 100 sec$^{-1}$, 20° C.)
Shelf-life: very good Silicone Emulsion 9 (Component a)+B$_4$)) (SIL 9)

524 g of trimethylsilyl-terminated polydimethylsiloxane (viscosity 1000 mm$^2$/s, 25° C.) (commercial product: BAYSILONE® Oil M 1000) are initially introduced. Thereafter, 24 g of 2-aminoethyl-3-aminopropyl-methyl-dimethoxysilane (Dynasilan® 1411, from Hüls) and then 0.32 g of sodium hydroxide solution (50% strength) are added. The vessel content is heated to 115° C. in the course of 2 hours. Stirring is carried out for 6 hours at 115° C., a gentle stream of N$_2$ being passed over. Stirring is then carried out for a further 1 hour in vacuo at 65 hPa. During the condensation (6 hours), 8 g of distillate are removed. A polysiloxane functionalized with 2-aminoethyl-3-aminopropyl side chains (base N content=0.56% by weight, viscosity at 20° C./100 s$^{-1}$=100 mPas) is obtained.

The aminopolysiloxane prepared in this manier is initially introduced at 55° C., and 13.0 g of caprolactone and 100 g of ethyl acetate are added. 0.16 g of dibutyltin dilaurate and 10 g of ethyl acetate are then added. The mixture is stirred for 10 hours at approx. 75° C. (the carbonyl band of the lactone (at 1722 cm$^{-1}$) is no longer present in the IR spectrum). The ethyl acetate is then distilled off (about 110 g). After cooling to 30–40° C., 115 g of acetone and 21 g of maleic anhydride in 20 g of acetone are added and stirring is carried out for 2 hours at 65° C. (anhydride no longer detectable). Thereafter, 24 g of triethylamine are metered in while stirring and stirring is carried out for a further 10 minutes. 270 g of isopropanol are then added. At 55° C., 950 g of water are pumped in with rapid stirring in the course of 3 hours. After the addition of 0.3 g Respumit S in 50 g of water, 16 g of a cyanamide-polyisocyanate reaction product 5 (PU 5) are added. The dispersion obtained is freed from the solvent at 50° C. and 140–250 hPa (413 g of distillate) and filtered over a 20 µm sieve. A white, finely divided emulsion is obtained.

Solids content: 37% by weight
pH: about 7 (undiluted)
Mean particle size: 200 nm
Miscibility with water: in any ratio
Viscosity: 25 mPas (at 100 sec$^{-1}$, 20° C.)
Shelf-life: very good Silicone Emulsion 10 (Component a)+B$_4$)) (SIL 10)

524 g of trimethylsilyl-terminated polydimethylsiloxane (viscosity 5000 mm$^2$/s, 25° C.) (commercial product: BAYSILONE® Oil M 5000) are initially introduced. Thereafter, 24 g of 2-aminoethyl-3-aminopropyl-methyl-dimethoxysilane (Dynasilan® 1411, from Hüls) and then 0.32 g of sodium hydroxide solution (50% strength) are added. The vessel content is heated to 115° C. in the course of 2 hours. Stirring is carried out for 6 hours at 115° C., a gentle stream of $N_2$ being passed over. Stirring is then carried out for a further 1 hour in vacuo at 65 hPa. During the condensation (6 hours), 6 g of distillate are removed. A polysiloxane functionalized with 2-aminoethyl-3-aminopropyl side chains (base N content=0.56% by weight, viscosity at 20° C./100 $s^{-1}$=150 mPas) is obtained.

The aminopolysiloxane prepared in this manner is initially introduced at 55° C., and 13.0 g of caprolactone and 100 g of ethyl acetate are added. 0.16 g of dibutyltin dilaurate and 10 g of ethyl acetate are then added. The mixture is stirred for 10 hours at approx. 75° C. (the carbonyl band of the lactone (at 1722 $cm^{-1}$) is no longer present in the IR spectrum). The ethyl acetate is then distilled off (about 110 g). After cooling to 30–40° C., 115 g of acetone and 21 g of maleic anhydride in 20 g of acetone are added and stirring is carried out for 2 hours at 65° C. (anhydride no longer detectable). Thereafter, 24 g of triethylamine are metered in while stirring and stirring is carried out for a further 10 minutes. 270 g of isopropanol are then added. At 55° C., 950 g of water are pumped in with rapid stirring in the course of 3 hours. After the addition of 0.3 g Respumit S in 50 g of water, 16 g of a cyanamide-polyisocyanate reaction product 5 (PU 5) are added. The dispersion obtained is freed from the solvent at 50° C. and 140–250 hPa (413 g of distillate) and filtered over a 20 μm sieve. A white, finely divided emulsion is obtained.

Solids content: 37% by weight
pH: about 7 (undiluted)
Mean particle size: 250 nm
Miscibility with water: in any ratio
Viscosity: 35 mPas (at 100 $sec^{-1}$, 20° C.)
Shelf-life: very good Silicone Emulsion 11 (Component a)+$B_4$)) (SIL 11)

524 g of trimethylsilyl-terminated polydimethylsiloxane (viscosity 1000 $mm^2$/s, 25° C.) (commercial product BAYSILONE® Oil M 1000) are initially introduced. Thereafter 23.5 g of 2-aminoethyl-3-aminopropyl-methyl-dimethoxysilane (Dynasilan® 1411, from Hüls) and then 0.32 g of sodium hydroxide solution (50% strength) are added. The vessel content is heated to 140° C. in the course of 2 hours. Stirring is carried out for 6 hours at 140° C., a gentle stream of $N_2$ being passed over. Stirring is then carried out for a further 1 hour in vacuo at 65 hPa. During the condensation (6 hours), 8 g of distillate are removed. A polysiloxane functionalized with 2-aminoethyl-3-aminopropyl side chains (base N content=0.52% by weight, viscosity at 20° C./100 $s^{-1}$=110 mpas) is obtained.

The aminopolysiloxane prepared in this manner is initially introduced at 55° C., and 12.5 g of caprolactone and 100 g of ethyl acetate are added. 0.16 g of dibutyltin dilaurate and 10 g of ethyl acetate are then added. The mixture is stirred for 10 hours at approx. 75° C. (the carbonyl band of the lacione (at 1722 $cm^{-1}$) is no longer present in the IR spectrum). The ethyl acetate is then distilled off (about 110 g). After cooling to 30–40° C., 115 g of acetone and 21.1 g of maleic anhydride in 20 g of acetone are added and stirring is carried out for 2 hours at 65° C. (anhydride no longer detectable). Thereafter, 23.6 g of triethylamine are metered in while stirring and stirring is carried out for a further 10 minutes. 270 g of isopropanol are then added. At 55° C., 950 g of water are pumped in with rapid stirring in the course of 3 hours. After the addition of 0.3 g RESPUMIT® S in 50 g of water, 16 g of a cyanamide-polyurea reaction product (=Isocyanate polyadduct 6 (PU 6)) are added. The dispersion obtained is freed from the solvent at 50° C. and 140–250 hPa (500 g of distillate) and filtered over a 20 μm sieve. A white, finely divided emulsion is obtained. If necessary, aftertreatment for adjusting the particle size of the emulsion is carried out during the emulsification process or thereafter using a jet disperser (nozzle principle) or a flow cell with an ultrasonic sonotrode or using a high shear mixer (rotor/stator principle) or by using a high pressure homogenizer.

Solids content: 37% by weight
pH: about 7 (undiluted)
Mean particle size: 300 nm
Miscibility with water: in any ratio
Viscosity: 25 mnPas (at 100 $sec^{-1}$, 20° C.)
Shelf-life: very good Use Examples Production of the Water-repellent Leather The dispersions were tested as auxiliaries for the production of water-repellent leathers. The following formulation is suitable for water-repellent upper leathers.

Material: Chrome-tanned wet blue, grain leather, contains 2.5% of $Cr_2O_3$

Shaved thickness: 2 mm

The following data in % are based in each case on the shaved weight. The amounts of auxiliaries used in the following formulation are based on the active ingredient availability or the solids content.

| | | |
|---|---|---|
| Neutralization | 100% of water, 40° C. | |
| | +1% of sodium formate | (2–4 hours) |
| | +0.5% of sodium bicarbonate | |
| | Required pH of the liquor at the end: 5.0 to 5.5 | |
| | Discharge liquor | |
| Dyeing | 100% of water, 40° C. | |
| | +1% of a dye (e.g. BAYGEN ® Brown CGG, Bayer AG) | |
| Retanning | +4% of a retanning agent (e.g. TANIGAN ® QF, Bayer AG; synthetic polycondensate Replacement tanning agent (pH about 5.3)) | (2 hours) |
| | +8% of vegetable tanning agent (e.g. sweetened chestnut) | |
| | pH of the liquor at the end: 4.5 to 5.0 | |

| | | -continued | |
|---|---|---|---|
| Washing | Discharge liquor<br>200% of water, 50° C.<br>Discharge liquor | 10 minutes | |
| Imparting water repellency | +0.2% of NH$_4$OH (10% strength solution<br>pH of the liquor 5 to 6<br>Discharge liquor<br>+100% of water, 50° C.<br>+x % of dispersion b)<br>(Component B$_1$, B$_2$, B$_3$<br>or B$_4$ or mixtures thereof)<br>+y % of polysiloxane emulsion<br>(=Component a) or a) +B$_4$)<br>pH of the liquor at the end: 4.9 to 5.0<br>Discharge liquor | 30 minutes<br><br><br><br><br><br>3 hours<br><br>1 hour | |
| Fixing | +0.5% of HCOOH<br>pH of the liquor at the end: 3.5–4.0<br>Discharge liquor (clear and colourless). | 0.5 hour | |
| Finishing | Rinse thoroughly, place leather overnight on a frame, set out, hang to dry, stake, apply vacuum (1 minute at 70° C.). | | | x % and y % relate to the amounts used. as stated in the Table below.

Soft, tight-grained leathers having a pleasant full handle were obtained. The grain side was very smooth. The water absorption in the case of the leather produced by processes described above was less than 30% after 24 hours.

The following tests are suitable for determining the water-repellent effect:

1. Water absorption after 24 hours on a leather sample [IUP 7/DIN 53330 (Kubelka-Nemec)]

2. Bally penetrometer with reference to DIN 53338/IUP 10 of the International Union of Leather Chemists Associations (cf. Das Leder [Leather] 12, pages 36 to 40 (1961))

3. Maeser test (based on ASTM D 2099-70)

The Maeser test is particularly suitable for assessing the dynamic water-repellent effect.

The test results with the use of the products according to the invention and the comparative products are shown in the Table below (unless stated otherwise, fixing with 0.5% of COOH):

| Ex. | Sample designation Comp. b) | x % | Type of component b) | Sample designation Comp. a) | y % | Maeser Flexes | Surface handle | Handle | Body | Level-ness |
|---|---|---|---|---|---|---|---|---|---|---|
| 1 | PAC 4 | 4 | B1 + B3 | SIL 1 | 2 | >44000 | 5 | 5 | 5 | 5 |
| 2 | PAC 3 | 4 | B1 + B3 | SIL 1 | 2 | 46000 | 5 | 5 | 5 | 5 |
| 3 | PAC 3 | 4 | B1 + B3 | SIL 2 | 1 | >55000 | 5 | 5 | 5 | 5 |
| 4 | PAC 3 | 4 | B1 + B3 | SIL 2 | 1.5 | >140000 | 5 | 5 | 5 | 5 |
| 5 | PAC 3 | 4 | B1 + B3 | SIL 2 | 2 | >140000 | 5 | 5 | 5 | 5 |
| 6 | PAC 3 | 4 | B1 + B3 | SIL 3* | 1 | >140000 | 5 | 5 | 5 | 5 |
| 7 | PAC 3 | 4 | B1 + B3 | SIL 3* | 2 | >140000 | 5 | 5 | 5 | 5 |
| 8 | PAC 3 | 4 | B1 + B3 | SIL 4 | 2 | >140000 | 5 | 5 | 5 | 5 |
| 9 | None | 0 | — | SIL 2 | 2 | 22600 | 4 | 3 | 2 | 2 |
| 10 | None | 0 | — | SIL 3* | 2 | >52500 | 3(Si) | 3 | 2 | 2 |
| 11 | PAC 1 | 4 | B1 | None | 0 | 1380 | 5 | 4 | 4 | 5 |
| 12 | PAC 2 | 4 | B1 + B3 | None | 0 | 2200 | 5 | 5 | 5 | 5 |
| 13 | PAC 3 | 4 | B1 + B3 | None | 0 | 3300 | 5 | 5 | 5 | 5 |
| 14 | PAC 4 | 4 | B1 + B3 | None | 0 | 2500 | 5 | 4 | 5 | 5 |
| 15 | Lubritan ® WP | 4 | B1 | None | 0 | 900 | 5 | 5 | 5 | 4 |
| 16 | Leukotan ® XE | 4 | B1 | None | 0 | 150 | 5 | 5 | 4 | 4 |
| C1 | Densodrin ® EN | 8 | — | Compar. | 2 | 10800 | 3 | 3 | 4 | 3 |
| C2 | Densodrin ® EN | 8 | — | Compar. | 2 | 31000 | 5 | 5 | 5 | 4 |
| 17 | PAS 1 | 4 | B2 | SIL 3* | 2 | >45000 | 5 | 5 | 4 | 5 |
| 18 | PAC 3 | 4 | B1 + B3 | SIL 5 | 2 | >68000 | 5 | 5 | 5 | 5 |
| 19 | PAC 4 | 4 | B1 + B3 | SIL 5 | 2 | >55000 | 5 | 5 | 5 | 5 |
| 20 | None | 0 | — | SIL 5 | 2 | >60000 | 3 | 4 | 4 | 3 |
| 21 | PAC 1 | 4 | B1 | SIL 6 | 2 | >49000 | 5 | 5 | 5 | 5 |
| 22 | PAC 3 | 4 | B1 + B3 | SIL 6 | 2 | >48000 | 5 | 5 | 5 | 5 |
| 23 | PAC 3 | 4 | B1 + B3 | SIL 7 | 2 | 33600 | 5 | 5 | 5 | 5 |
| 24 | PAC 3 | 4 | B1 + B3 | SIL 8** | 2 | >48000 | 5 | 5 | 5 | 5 |
| 25 | PAC 6 | 4 | B1 + B3 | SIL 9*** | 2 | >45000 | 5 | 5 | 5 | 5 |
| 26 | PAC 6 | 4 | B1 + B3 | SIL 10*** | 2 | >50000 | 5 | 5 | 5 | 5 |
| 27 | PAC 6 | 4 | B1 + B3 | SIL 11 | 2 | >70000 | 5 | 5 | 5 | 5 |

*SIL 3 = Component a) + B4
**SIL 8 = Component a) + B4
***SIL 9 to SIL 11 = Component a) + B4

C1 (=Comparative Example 1): 8% of Densodrin® EN+2% of siloxane emulsion according to Example 5 of DE 196 46 916

C2 (=Comparative Example 2): as for C1 but fixed with 2% of chromium(III) sulphate (CHROMOSAL® B, Bayer AG) (33% basicity) instead of 0.5% of HCOOH.

It is evident that the process according to the invention gives leathers which are superior or at least equivalent to the prior art with respect to water repellency, expressed as the number of flexes in the Maeser test, and with respect to softness, surface handle and colour uniformity. This applies in particular to the water repellency imparted according to the invention with a combination of component b) and component a). A particular advantage of the water-repellent system according to the invention is that the high level of properties is also achieved Without fixing with mineral salts. By adding component B4, the permanence, i.e. resistance to washing, and the shelf life is also improved. The use of chromium salts, for example, has no additional advantages over fixing with formic acid. In the case of the known water repellents, chromium fixing is always recommended for achieving high water-repellency values.

Where application takes place in the drum it is also advantageous additionally to add polyisocyanate adducts to the treatment liquor containing the silicone emulsion. These polyisocyanate adducts are in particular those which can react with the carboxyl groups of the silicone component, such as for example in particular products containing carbodiimide groups, such as BAYDERM3Fix PCL or polyisocyanates such as BAYDERM® Fix CIN or AQUADERM® XL 50.

In addition, the leathers treated with the water-repellent system according to the invention are distinguished by better finishability and water vapour permeability compared with the leathers which were produced using water repellents according to the prior art.

In particular, the adhesion of the organically based or water-based finishing products to be applied (BAYDERM® Bottom APV, then, for example, BAYDERM® Finish 65UD or BAYDERM® Finish DLF) after drying of the coatings is substantially better than that according to the prior art. In particular, polyurethane dispersions which are used as bottoms surprisingly have an improved affinity to the water-repellent system according to the invention. Overall, a substantially improved bond between leather surface and the applied finish films is thus achieved.

A further advantage is that the amounts of the water-repellent system according to the invention which are used are very small, so that the water vapour permeability of the finished leathers and hence the breathability of the total substrate are not adversely affected.

What is claimed is:

1. A water-repellent system comprising
   (a) a polysiloxane containing carboxyl groups wherein the polysiloxane chain contains
   at least one structural unit of the formula (1)

$$[AR_aSiO_{(3-a)/2}]_k \quad (1)$$

and/or at least one structural unit of the formula (2)

$$[R_cSiO_{(4-c)/2}]_n \quad (2)$$

and optionally at least one terminal group selected from the formulas $$R_3SiO_{1/2} \quad (3)$$

and $$AR_2SiO_{1/2} \quad (3a),$$

wherein
   A represents a radical containing carboxyl groups and has the formula

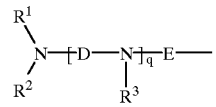

wherein
   $R^1$, $R^2$, and $R^3$, independently of one another, represent hydrogen or a monovalent $C_2$–$C_{60}$-hydrocarbon radical that optionally contains one or more non-neighboring ether, imino, amido, urea, urethane, ester, or carboxyl groups and that is optionally substituted by one or two carboxyl groups —COOM and/or one or two hydroxyl groups, wherein
   M represents hydrogen, $Na^+$, $K^+$, $Li^+$, $NH_4^+$, or

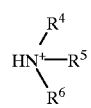

in which $R^4$, $R^5$ and $R^6$, independently of one another, represent $C_1$–$C_{18}$-alkyl or substituted $C_1$–$C_{18}$-alkyl, or aralkyl,
   D and E, independently of one another, represent a divalent $C_2$–$C_{20}$-hydrocarbon radical that is optionally substituted by hydroxyl or interrupted by non-neighboring O atoms, and
   q represents 0 to 3, with the provisos that (i) A is substituted at least by one group COOM, (ii) $R^1$ to $R^3$, independently of one another, are linked to the nitrogen atom via a single bond or a group —COO—, —CO— or —CONH—, and (iii) $R^1$ and $R^2$ do not simultaneously represent H and are not simultaneously linked to the nitrogen atom via a carbonyl group,
   R represents a $C_1$- to $C_{12}$-alkyl radical or a phenyl radical,
   a represents 0 or 1,
   k represents 0 to 50,
   c represents 1 or 2, and
   n represents 10 to 1000,
   with the proviso that at least one terminal group of the formula (3a) is present where the polysiloxane chain contains only structural units of the formula (2), and
   (b) at least one component from the group $B_1$ to $B_4$, wherein
   $B_1$ is an anionic copolymer,
   $B_2$ is polyaspartic acid or a derivative thereof,
   $B_3$ is a paraffin, and
   $B_4$ is an isocyanate adduct.

2. A water-repellent system according to claim 1 wherein in formula (1) $R^1$ to $R^3$, independently of one another, represent (1) a group represented by the formula

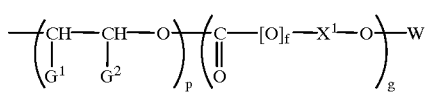

(1a)

wherein
$G^1$ and $G^2$, independently of one another, represent H or $CH_3$,
$X^1$ represents a divalent hydrocarbon radical having 2 to 30 carbon atoms,
W represents H or the group

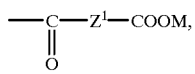

wherein
$Z^1$ represents a divalent hydrocarbon radical having 1 to 20 carbon atoms and
M represents hydrogen, $Na^+$, $K^+$, $Li^+$, $NH_4^+$, or

in which $R^4$, $R^5$ and $R^6$, independently of one another, represent $C_1$–$C_{18}$-alkyl or substituted $C_1$–$C_{18}$-alkyl, or aralkyl,
p represents 0 to 5,
f represents 0 or 1, and
g represents 0 to 3, or (2) a group represented by the formula

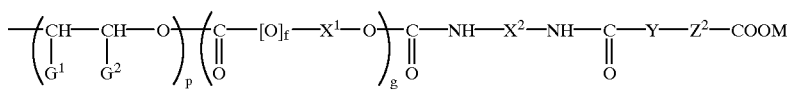

(1b)

wherein
$G^1$, $G^2$, $X^1$, W, p, f, g, and M have the above-mentioned meanings and
$X^2$ represents a divalent hydrocarbon radical having 2 to 20 carbon atoms,
$Z^2$ represents a divalent hydrocarbon radical having 1 to 20 carbon atoms that are optionally substituted by a further group —COOM, —$NH_2$ or —OH, in which M has the above-mentioned meaning, and
Y represents —O—, —NH— or —N($C_{1-4}$-alkyl)-, or (3) a group represented by the formula

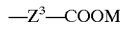

(1c)

wherein
$Z^3$ represents an alkyl radical having 1 to 10 carbon atoms that is optionally substituted by a further group —COOM, and
M has the above-mentioned meaning.

3. A water-repellent system according to claim 1 wherein component $B_1$ is an anionic copolymer prepared by free radical copolymerization of a mixture of monomers comprising (α) 10–90 mol % of the ester of a monoethylenically unsaturated $C_3$–$C_5$-carboxylic acid based on an alcohol having 4 to 40 carbon atoms
(β) 90–10 mol % of a monoethylenically unsaturated carboxylic acid
(γ) 0–20 mol % of a monoethylenically unsaturated $C_4$–$C_6$-dicarboxylic anhydride
(δ) 0–30 mol % of a $C_2$–$C_8$-olefin, and
(ε) 0–10 mol % of a further comonomer from the group consisting of styrene, alpha-methylstyrene and vinyl esters of $C_1$–$C_8$-carboxylic acids,
wherein the amounts are based on the monomer mixture, optionally followed by a subsequent partial reaction of the anhydride groups with a primary or secondary $C_1$–$C_{40}$-alcohol and/or a primary or secondary amine having one or two $C_1$–$C_{18}$-alkyl or alkenyl radicals, with the proviso that at least 20 mol % of the carboxyl groups corresponding to the anhydride groups are not reacted with alcohol and/or amine but are neutralized with a base, wherein at least 50 mol % of the total carboxyl groups are neutralized.

4. A water-repellent system according to claim 1 wherein component $B_2$ is a polyaspartic acid derivative having a number average molecular weight of 700 to 30000 obtained by reacting B2-A) polysuccinimide having a number average molecular weight of 500 to 10000 obtained by reaction of maleic anhydride and $NH_3$ solution and subsequent condensation, with B2-B) 5 to 90 mol %, based on succinimide units of the polysuccinimide, of primary and/or secondary amine whose nitrogen substituents contain 1 to 60 carbon atoms that are optionally substituted by hydroxyl radicals and/or interrupted by oxygen atoms, wherein at least 2.5 mol % of the nitrogen substituents of the amine contain at least 12 carbon atoms, and B2-C) 95 to 10 mol % of ring-opening base, in the presence of water.

5. A water-repellent system according to claim 1 wherein component $B_3$ is a paraffinic hydrocarbon that is optionally substituted by hydroxyl and/or carboxyl groups.

6. A water-repellent system according to claim 1 wherein component $B_4$ is a reaction product of $B_4$-a) an organic polyisocyanate
$B_4$-b) 0.0 to 0.9 equivalent of $C_6$–$C_{24}$-alcohol per equivalent of NCO or latent NCO contained in $B_4$-a),
$B_4$-c) 0.1 to 1.0 mol of cyanamide per equivalent of NCO or latent NCO contained in $B_4$-a), and
$B_4$-d) ammonia or volatile amine as neutralizing agent for the cyanamide groups, wherein the reaction products are free of polyester or polyether groups and free of halogen atoms.

7. A water-repellent system according to claim 1 wherein component $B_4$ is an anionically modified polyurea that is based on
I.
(a) organic polyisocyanates, II. polyfunctional NCO-reactive compounds from the series comprising
  (b) polyhydroxy compounds,
  (c) polyamines, and
  (d) amino alcohols,
III. optionally,
  (e) monofunctional NCO-reactive compounds, and
IV. optionally,
  (f) water,
and which contains anionic N-cyanoaminocarbonylurea groups of the formula

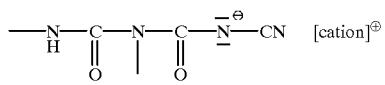

incorporated into the polymer chain and optional terminal anionic cyanourea groups of the formula

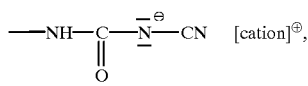

wherein the ratio of groups incorporated into the polymer chain to terminal groups is greater than 1:1 and wherein [cation]$^\oplus$ represents an alkali metal ion or an optionally substituted ammonium ion.

8. A water-repellent system according to claim 1 wherein component (b) contains at least one anionic copolymer $B_1$ prepared by free radical copolymerization of a mixture of monomers comprising
  ($\alpha$) 10–90 mol % of the ester of a monoethylenically unsaturated $C_3$–$C_5$-carboxylic acid based on an alcohol having 4 to 40 carbon atoms
  ($\beta$) 90–10 mol % of a monoethylenically unsaturated carboxylic acid
  ($\gamma$) 0–20 mol % of a monoethylenically unsaturated $C_4$–$C_6$-dicarboxylic anhydride
  ($\delta$) 0–30 mol % of a $C_2$–$C_8$-olefin, and
  ($\epsilon$) 0–10 mol % of a further comonomer from the group consisting of styrene, alpha-methylstyrene and vinyl esters of $C_1$–$C_8$-carboxylic acids,
wherein the amounts are based on the monomer mixture, optionally followed by a subsequent partial reaction of the anhydride groups with a primary or secondary $C_1$–$C_{40}$-alcohol and/or a primary or secondary amine having one or two $C_1$–$C_{18}$-alkyl or alkenyl radicals, with the proviso that at least 20 mol % of the carboxyl groups corresponding to the anhydride groups are not reacted with alcohol and/or amine but are neutralized with a base, wherein at least 50 mol % of the total carboxyl groups are neutralized.

9. A water-repellent system according to claim 1 wherein component (b) contains a mixture of
  (I) at least one anionic copolymer $B_1$ prepared by free radical copolymerization of a mixture of monomers comprising
    ($\alpha$) 10–90 mol % of the ester of a monoethylenically unsaturated $C_3$–$C_5$-carboxylic acid based on an alcohol having 4 to 40 carbon atoms
    ($\beta$) 90–10 mol % of a monoethylenically unsaturated carboxylic acid
    ($\gamma$) 0–20 mol % of a monoethylenically unsaturated $C_4$–$C_6$-dicarboxylic anhydride
    ($\delta$) 0–30 mol % of a $C_2$–$C_8$-olefin, and
    ($\epsilon$) 0–10 mol % of a further comonomer from the group consisting of styrene, alpha-methylstyrene and vinyl esters of $C_1$–$C_8$-carboxylic acids, wherein the amounts are based on the monomer mixture, optionally followed by a subsequent partial reaction of the anhydride groups with a primary or secondary $C_1$–$C_{40}$-alcohol and/or a primary or secondary amine having one or two $C_1$–$C_{18}$-alkyl or alkenyl radicals, with the proviso that at least 20 mol % of the carboxyl groups corresponding to the anhydride groups are not reacted with alcohol and/or amine but are neutralized with a base, wherein at least 50 mol % of the total carboxyl groups are neutralized, and
  (II) at least one paraffinic hydrocarbon $B_3$ that is optionally substituted by hydroxyl and/or carboxyl groups.

10. A water-repellent system according to claim 1 wherein component (b) contains at least one component $B_4$ obtained as a reaction product of
  $B_4$-a) an organic polyisocyanate,
  $B_4$-b) 0.0 to 0.9 equivalent of $C_6$–$C_{24}$-alcohol per equivalent of NCO or latent NCO contained in $B_4$-a),
  $B_4$-c) 0.1 to 1.0 mol of cyanamide per equivalent of NCO or latent NCO contained in $B_4$-a), and
  $B_4$-d) ammonia or volatile amine as neutralizing agent for the cyanamide groups, wherein the reaction products are free of polyester or polyether groups and free of halogen atoms.

11. A polysiloxane containing at least one structural unit of the formula (1d)

 (1d)

and/or at least one structural unit of the formula (2)

 (2)

and optionally at least one terminal group selected from the formulas

 (3)

and

 (3d), wherein $A^1$ represents a radical selected from the group consisting of

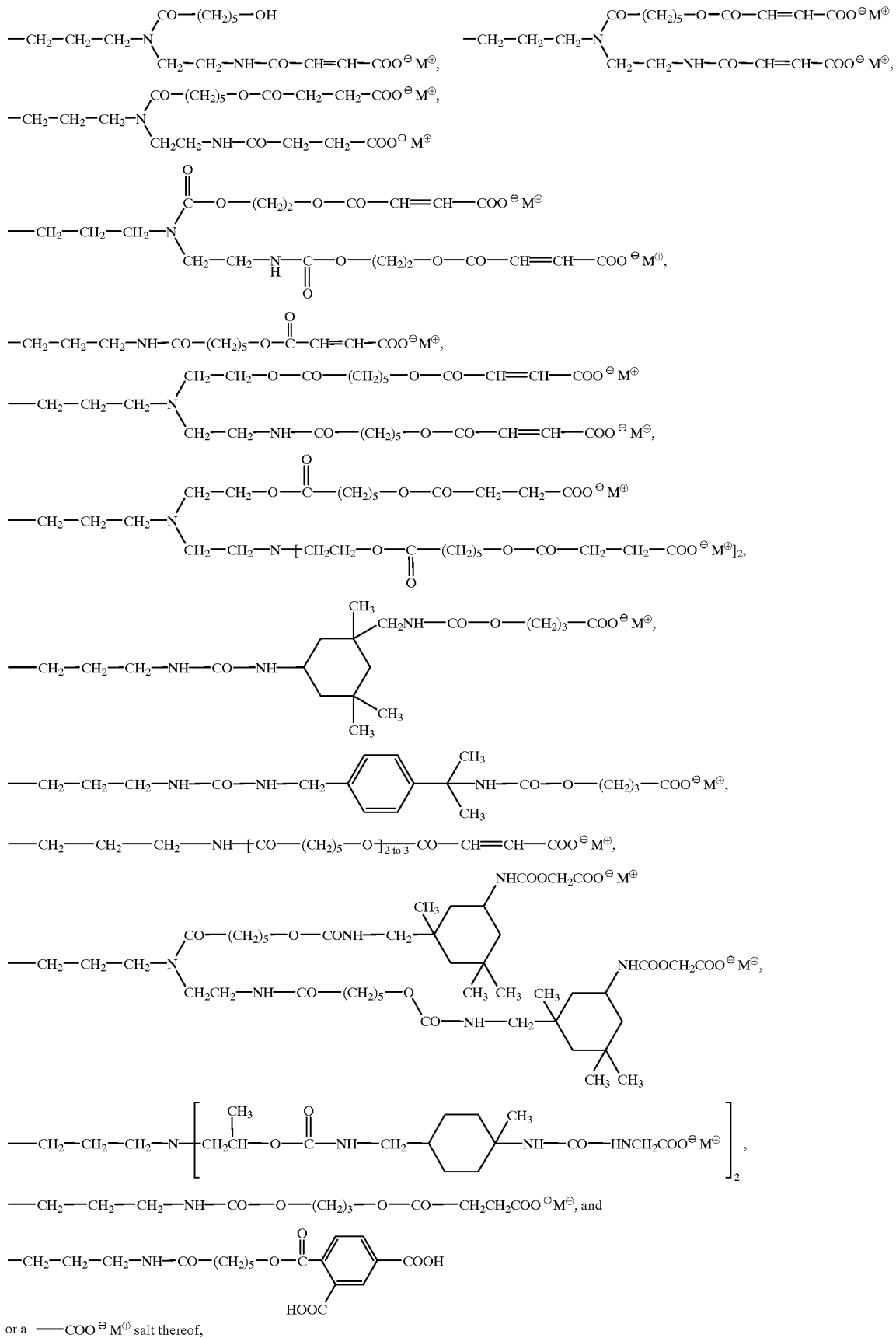

-continued

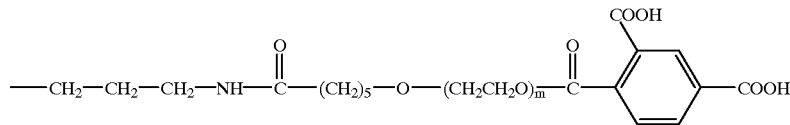

or a —COO⊖ M⊕ salt thereof,

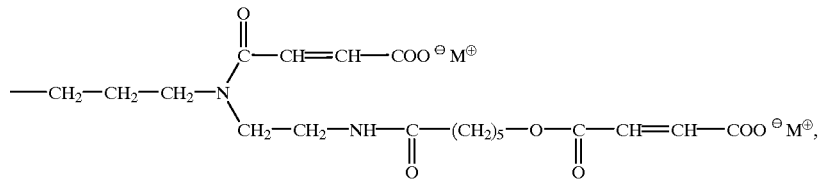

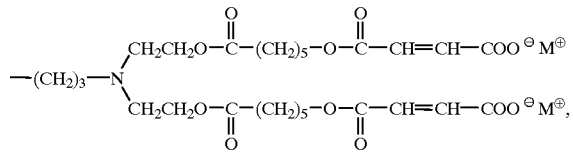

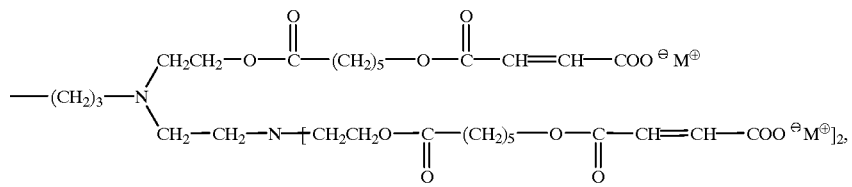

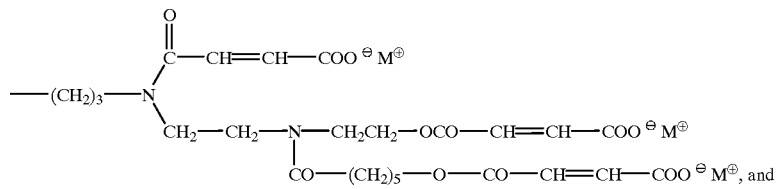

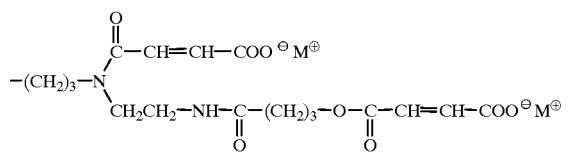

wherein
M represents hydrogen, $Na^+$, $K^+$, $Li^+$, $NH_4^+$, or

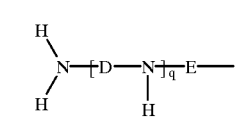

in which $R^4$, $R^5$ and $R^6$, independently of one another, represent $C_1$–$C_{18}$-alkyl or substituted $C_1$–$C_{18}$-alkyl, or aralkyl, R represents a $C_1$- to $C_{12}$-alkyl radical or a phenyl radical,
a represents 0 or 1,
k represents 0 to 50, and
c represents 1 or 2.

12. A process for the preparation of a polysiloxane according to claim 11 comprising
(a) reacting
   (i) an aminopolysiloxane containing structural units of the formula (2)

$$[R_cSiO_{(4-c)/2}]_n \quad (2)$$

and structural units of the formula (4)

$$[A'R_aSiO_{(3-a)/2}]_k \quad (4)$$

and/or optionally terminal groups of the formula (4a)

$$A'R_2SiO_{1/2} \quad (4a)$$

and/or optionally terminal groups of the formula (3)

$$R_3SiO_{1/2} \quad (3),$$

wherein
A' represents a radical of the formula $$\underset{H}{\overset{H}{N}}-[D-\underset{H}{N}]_q-E-$$

wherein
D and E, independently of one another, represent a divalent $C_2$–$C_{20}$-hydrocarbon radical that is optionally substituted by hydroxyl or interrupted by non-neighboring O atoms, and
q represents 0 to 3,
R represents a $C_1$- to $C_{12}$-alkyl radical or a phenyl radical, a represents 0 or 1,
k represents 0 to 50,
c represents 1 or 2, and
n represents 10 to 1000,
or a corresponding hydroxyalkyl-aminopolysiloxane prepared by reacting the aminopolysiloxane with a $C_1$-$C_{10}$-alkylene oxide, with
(ii) a lactone (6a)

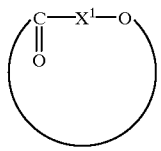

(6a)

or a cyclic carbonate (6b)

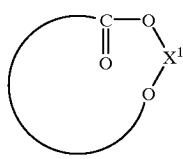

(6b)

wherein $X^1$ represents a divalent hydrocarbon radical having 2 to 30 carbon atoms,
to form a hydroxyl-functionalized polysiloxane containing structural units of the formula (2)

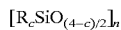

$[R_cSiO_{(4-c)/2}]_n$ (2)

and of the formula (5)

$[A''R_aSiO_{(3-a)/2}]_k$ (5)

and/or optionally terminal groups of the formula (5a)

$A''R_2SiO_{1/2}$ (5a)

and/or optionally of the formula (3)

$R_3SiO_{1/2}$ (3), wherein R, a, k, c, and n have the above-mentioned meaning and
A" represents the radical

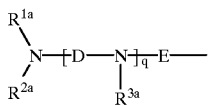

wherein D, E, and q have the above-mentioned meaning and $R^{1a}$, $R^{2a}$, and $R^{3a}$ represent H or the group

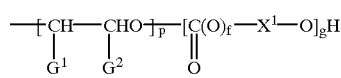

wherein
$G^1$ and $G^2$, independently of one another, represent H or $CH_3$,
$X^1$ represents a divalent hydrocarbon radical having 2 to 30 carbon atoms, p represents 0 to 5,
f represents 0 or 1, and
g represents 0 to 3,
(b) reacting the hydroxyl-functionalized polysiloxane with a polycarboxylic acid derivative of the formula

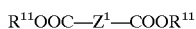

$R^{11}OOC-Z^1-COOR^{11}$ or with a polycarboxylic anhydride of the formula (6c)

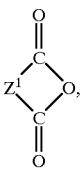

(6c)

wherein
$Z^1$ represents a divalent hydrocarbon radical having 1 to 20 carbon atoms and
$R^{11}$ represents $C_1$- to $C_4$-alkyl, to form a polysiloxane containing structural units containing carboxyl groups of the formula —COOH, and
(c) converting the resultant polysiloxane with a base into the salt form having a —COO$^{\ominus}$ M$^{\oplus}$ group wherein M represents hydrogen, Na$^+$, K$^+$, Li$^+$, NH$_4^+$, or

in which $R^4$, $R^5$ and $R^6$, independently of one another, represent $C_1$–$C_{18}$-alkyl or substituted $C_1$–$C_{18}$-alkyl, or aralkyl.

13. An aqueous dispersion containing at least one polysiloxane according to claim 11.

14. A process for the preparation of an aqueous dispersions containing at least one polysiloxane according to claim 11 comprising dispersing at least one polysiloxane according to claim 11 in water, optionally in the presence of a solvent, and distilling off any solvent present.

15. A method of imparting water repellency to a substrate comprising treating the substrate with a water-repellent system according to claim 1.

16. A method according to claim 15 wherein the substrate is leather and/or a hide.

17. A method of imparting water repellency to a substrate comprising treating the substrate with at least one polysiloxane according to claim 11.

18. A method according to claim 17 wherein the substrate is leather and/or a hide.

19. A method of imparting water repellency to a substrate comprising treating the substrate with at least one polysiloxane dispersion according to claim 13.

20. A method according to claim 19 wherein the substrate is leather and/or a hide.

21. A substrate rendered hydrophobic by treatment with at least one polysiloxane according to claim 11.

22. A substrate rendered hydrophobic by treatment with at least one water-repellent system according to claim 1.

* * * * *